US012641144B2

(12) United States Patent (10) Patent No.: US 12,641,144 B2
Liu et al. (45) Date of Patent: May 26, 2026

(54) COMPUTATION OFFLOADING METHOD AND COMMUNICATION APPARATUS

(71) Applicant: HUAWEI TECHNOLOGIES CO., LTD., Shenzhen (CN)

(72) Inventors: Zhicheng Liu, Tianjin (CN); Jinduo Song, Tianjin (CN); Mingyu Zhao, Shanghai (CN); Xueqiang Yan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 805 days.

(21) Appl. No.: 17/990,944

(22) Filed: Nov. 21, 2022

(65) Prior Publication Data

US 2023/0081937 A1 Mar. 16, 2023

Related U.S. Application Data

(63) Continuation of application No. PCT/CN2021/088860, filed on Apr. 22, 2021.

(30) Foreign Application Priority Data

May 22, 2020 (CN) .......................... 202010438782.2

(51) Int. Cl.
*G06F 9/46* (2006.01)
*G06F 9/50* (2006.01)
(Continued)

(52) U.S. Cl.
CPC ............ *H04L 67/08* (2013.01); *G06F 9/5077* (2013.01); *G06F 9/5083* (2013.01); (Continued)

(58) Field of Classification Search
CPC .... G06F 9/5083; G06F 9/5077; G06F 9/5094; G06F 2209/509; G06F 18/217; (Continued)

(56) References Cited

U.S. PATENT DOCUMENTS

2016/0162004 A1* 6/2016 Ljubuncic ............. G06F 9/5083
713/320
2018/0183855 A1 6/2018 Sabella et al.
(Continued)

FOREIGN PATENT DOCUMENTS

CN 106534333 A 3/2017
CN 106899026 A * 6/2017 ................ H02J 3/24
(Continued)

OTHER PUBLICATIONS

Author: Cao et al., Title: Multiagent Deep Reinforcement Learning for Joint Multichannel Access and Task Offloading of Mobile-Edge Computing in Industry 4.0, publication date: Mar. 16, 2020, Publisher: IEEE, Edition or Volume: vol. 7, Pertinent pages: 6201-6213 (Year: 2020).*

(Continued)

*Primary Examiner* — April Y Blair
*Assistant Examiner* — Zhi Chen
(74) *Attorney, Agent, or Firm* — Maier & Maier, PLLC

(57) ABSTRACT

A computation offloading method and an apparatus. In network edge computation offloading, an edge node receives states of computational tasks sent by one or more served terminal devices and determines allocation of computing resources based on received states of one or more computational tasks. Then, the edge node broadcasts the allocation of the computing resources to the served terminal devices, and the terminal devices each determine, based on the resource allocation, whether to offload the computational task to the edge node for computing. Therefore, the edge node and the terminal device each can have a wider capability of sensing an environment in actual decision-making, thereby effectively improving decision-making benefits of the edge node and the terminal device.

20 Claims, 10 Drawing Sheets

(51) Int. Cl.
     *G06F 18/21*         (2023.01)
     *H04L 67/08*         (2022.01)
     *H04L 67/10*         (2022.01)

(52) U.S. Cl.
     CPC .......... *G06F 9/5094* (2013.01); *G06F 18/217*
           (2023.01); *H04L 67/10* (2013.01)

(58) Field of Classification Search
     CPC ..... H04L 67/08; H04L 67/10; H04L 67/1008;
           H04L 67/101; H04L 67/34; H04L 67/59;
           H04L 65/40; Y02D 10/00
     See application file for complete search history.

(56)             References Cited

U.S. PATENT DOCUMENTS

| | | | |
|---|---|---|---|
| 2019/0208007 A1* | 7/2019 | Khalid | ................ H04L 67/1021 |
| 2020/0026575 A1 | 1/2020 | Guim Bernat et al. | |
| 2021/0019194 A1* | 1/2021 | Bahl | ................... H04L 67/1031 |
| 2021/0136785 A1* | 5/2021 | Elsayed | ............. H04W 72/535 |
| 2021/0174205 A1* | 6/2021 | Rosa | ...................... G06N 3/044 |
| 2022/0360645 A1* | 11/2022 | Badic | ...................... H04L 67/51 |
| 2022/0385536 A1* | 12/2022 | Suzuki | ............... H04L 41/0895 |

FOREIGN PATENT DOCUMENTS

| | | | | | |
|---|---|---|---|---|---|
| CN | 108540406 A | * | 9/2018 | ............. | H04L 7/783 |
| CN | 108632861 A | | 10/2018 | | |
| CN | 109684075 A | | 4/2019 | | |
| CN | 109803292 A | | 5/2019 | | |
| CN | 110351309 A | | 10/2019 | | |
| CN | 110418416 A | * | 11/2019 | ........... | H04W 72/04 |
| CN | 110418418 A | | 11/2019 | | |
| CN | 110427261 A | * | 11/2019 | ........... | G06F 9/4843 |
| CN | 110958680 A | * | 4/2020 | ........... | H04W 84/08 |

OTHER PUBLICATIONS

Chen, "Decentralized Computation Offloading Game For Mobile Cloud Computing", IEEE Transactions on Parallel and Distributed Systems, Apr. 11, 2014, 10 pages.

Chen et al., "Decentralized Computation Offloading for Multi-User Mobile Edge Computing: A Deep Reinforcement Learning Approach", IEEE, Dec. 16, 2018, 27 pages.

Ren et al., "Federated Learning-based Computation Offloading Optimization in Edge Computing-supported Internet of Things", IEEE Access, Jun. 3, 2019, 8 pages.

* cited by examiner

COMPUTATION OFFLOADING METHOD AND COMMUNICATION APPARATUS

CROSS-REFERENCE TO RELATED APPLICATIONS

This application is a continuation of International Application No. PCT/CN2021/088860, filed on Apr. 22, 2020, which claims priority to Chinese Patent Application No. 202010438782.2, filed on May 22, 2020. The disclosures of the aforementioned applications are hereby incorporated by reference in their entireties.

TECHNICAL FIELD

The embodiments relate to the communications field, a computation offloading method, and a communication apparatus.

BACKGROUND

With the emergence of the internet, terminal devices are upgraded, and new applications are emerging. At the same time, it is gradually difficult for a computation capability of the terminal device to meet a performance requirement of a user service. Although the emergence of cloud computing alleviates resource restrictions of terminals to some extent, a service delay, a transmission rate, data security, and the like still need to be improved, especially for high-real-time and high-security applications such as self-driving and real-time video surveillance. This drives a new transformation of a cloud computing mode.

As a concept evolution of the cloud computing, edge computing proposes to provide computing and storage resources at a network edge, and features a lower delay, lower energy consumption, bandwidth saving, high privacy, and more intelligent. In addition, derivative concepts such as cloudlet, fog computing, mobile edge computing, and multi-access edge computing (MEC) emerge. As a key technology for implementing the vision of the internet of things and the fifth-generation mobile communications technology (5G), the edge computing (and its derivative concepts) is at an intersection of a computing mode and network communication and is irreplaceable in meeting various service requirements and improving user experience.

Similar to a computation offloading method in the cloud computing, the edge computing means that the terminal device offloads a computation-intensive task to a network edge node for computing and receives a running result of a corresponding task to achieve computation offloading. For the edge computing, two aspects need to be considered. In one aspect, the terminal device has disadvantages such as a low computation capability, high energy sensitivity, and a small quantity of supported functions. In the other aspect, the network edge node also has phenomena such as scattered computing resources, different power supply manners, and diversified system architectures. Therefore, how to better manage and allocate a computation capability of the edge node becomes an important issue that urgently needs to be paid attention to.

SUMMARY

The embodiments may provide a computation offloading method and a communication apparatus, so that an edge node and a terminal device each can have a wider capability of sensing an environment in actual decision-making, thereby effectively improving decision-making benefits of the edge node and the terminal device.

According to a first aspect, a method is provided. The method includes: A first terminal device sends a first state of a first computational task to a first edge node, where the first edge node is an edge node from which the first terminal device obtains computing resources, and the first state includes at least one of a length of a data stream for transmitting the first computational task, a quantity of clock cycles that need to be consumed for computing the first computational task, and a penalty value of the first computational task; the first terminal device receives a second offloading decision sent by the first edge node, where the second offloading decision is determined based on the first state, the second offloading decision includes computing resource allocation information of one or more second terminal devices, the second terminal device is a terminal device that obtains computing resources from the first edge node, and the first terminal device is one of the one or more second terminal devices; and the first terminal device determines a first offloading decision of the first computational task according to the second offloading decision, where the first offloading decision indicates whether the first terminal device offloads the first computational task to the first edge node for computing.

The terminal device may send the computational task to the edge node and the edge node may determine allocation of the computing resources based on states of received one or more computational tasks. Then, the edge node sends the allocation of the computing resources to served terminal devices, and the terminal device determines, based on the resource allocation, whether to offload the computational task to the edge node for computing. Therefore, the terminal device can have a wider capability of sensing an environment in actual decision-making, thereby effectively improving decision-making benefits of the edge node and the terminal device.

With reference to the first aspect, in some implementations of the first aspect, when the first offloading decision indicates the first terminal device to offload the first computational task to the first edge node for computing, the first terminal device sends the first computational task to the first edge node; and the first terminal device receives a computation result that is of the first computational task and that is sent by the first edge node; or when the first offloading decision indicates the first terminal device not to offload the first computational task, the first terminal device locally determines a computation result of the first computational task.

With reference to the first aspect, in some implementations of the first aspect, that the first terminal device determines a first offloading decision of the first computational task according to the second offloading decision includes: The first terminal device updates a parameter in the first state of the first computational task according to the second offloading decision, to obtain a second state of the first computational task; the first terminal device computes a cost value of the first computational task based on the second state, where the cost value of the first computational task includes a local overhead and an offloading overhead of the first computational task; and the first terminal device determines the first offloading decision of the first computational task based on the cost value of the first computational task.

The terminal device may determine, based on the resource allocation of the edge node, whether to offload the computational task to the edge node for computing. Therefore, the terminal device can have a wider capability of sensing an environment in actual decision-making, thereby effectively improving decision-making benefits of the edge node and the terminal device.

With reference to the first aspect, in some implementations of the first aspect, that the terminal device computes a cost value of the first computational task based on the second state includes: The first terminal device determines the cost value of the first computational task based on the second state by using a first cost function in a multi-agent deep reinforcement learning (MADRL) algorithm, where the first cost function includes an offload overhead function and a local computation overhead function, the offload overhead function is used to determine the offloading overhead of the first computational task, and the local computation overhead function is used to determine the local overhead of the first computational task; and that the first terminal device determines the first offloading decision of the first computational task based on the cost value of the first computational task includes: The first terminal device iteratively updates a state of the first computational task and the cost value of the first computational task of the first terminal device based on the MADRL algorithm; and when the MADRL algorithm meets a termination condition, the first terminal device determines the first offloading decision of the first computational task based on a minimum cost value of the first computational task.

The terminal device may determine, based on the resource allocation by using the MADRL algorithm, whether to offload the computational task to the edge node for computing. Therefore, the terminal device can have a wider capability of sensing an environment in actual decision-making, thereby effectively improving decision-making benefits of the edge node and the terminal device.

With reference to the first aspect, in some implementations of the first aspect, the offloading overhead of the first computational task includes a first energy consumption overhead and a first delay overhead, the first energy consumption overhead includes energy consumed by the first terminal device to offload the first computational task to the first edge node; and the first delay overhead includes a delay of offloading, by the first terminal device, the first computational task to the first edge node and a delay of computing, by the first edge node, the computation result of the first computational task.

With reference to the first aspect, in some implementations of the first aspect, the local overhead of the first computational task includes a second energy consumption overhead and a second delay overhead; the second energy consumption overhead includes energy consumed by the first terminal device for locally computing the first computational task and energy consumed by the first terminal device for switching from sleep power $P_{sleep}$ to first operating power $P_1$; the second delay overhead includes a delay of locally computing the first computational task by the first terminal device and a delay of switching the first terminal device from the sleep power to the first operating power $P_1$; and the first operating power $P_1$ is operating power of a local computational task of the first terminal device.

A power control factor may be introduced into the cost value computation of the computational task locally processed by the terminal device, and a cost loss during power switching may be added to the cost value computation of the terminal device. This helps describe decision content in the computation offloading of the terminal device more precisely, thereby effectively improving user experience and reducing a model error.

With reference to the first aspect, in some implementations of the first aspect, the first offloading decision further includes second operating power, and the second operating power is operating power corresponding to the minimum cost value of the first computational task when the MADRL algorithm meets the termination condition.

With reference to the first aspect, in some implementations of the first aspect, when the first offloading decision indicates the first terminal device to offload the first computational task to the first edge node for computing, the first terminal device operates at the sleep power.

With reference to the first aspect, in some implementations of the first aspect, the method further includes: The first terminal device dynamically adjusts the first delay overhead by using a first parameter, and the first parameter indicates a difference between processing a computational task by the first terminal device and processing a computational task by the first edge node.

A difference parameter may be introduced, so that decision content in computation offloading can be described more precisely.

With reference to the first aspect, in some implementations of the first aspect, the method further includes: The first terminal device dynamically adjusts the first energy consumption overhead and the second energy consumption overhead by using a second parameter, and the second parameter indicates sensitivity of the first terminal device to an energy consumption overhead.

An energy trade-off parameter may be introduced so that decision content in computation offloading can be described more precisely.

According to a second aspect, a method is provided. The method includes: A first edge node receives states of one or more tasks, where the states of the one or more tasks include a first state of a first computational task sent by a first terminal device, the first edge node is an edge node that provides computing resources for one or more second terminal devices, and the first terminal device is one of the one or more second terminal devices; the first edge node determines a second offloading decision based on the states of the one or more tasks, where the second offloading decision includes computing resource allocation information of the first edge node for the one or more second terminal devices; and the first edge node broadcasts the second offloading decision to the one or more second terminal devices.

An edge node may receive states of computational tasks sent by one or more served terminal devices and may determine allocation of computing resources based on received states of one or more computational tasks. Then, the edge node broadcasts the allocation of the computing resources to the served terminal devices, and the terminal devices each determine, based on the resource allocation, whether to offload the computational task to the edge node for computing. Therefore, the edge node and the terminal device each can have a wider capability of sensing an environment in actual decision-making, thereby effectively improving decision-making benefits of the edge node and the terminal device.

With reference to the second aspect, in some implementations of the second aspect, the first edge node receives the first computational task sent by the first terminal device; the first edge node determines a computation result of the first computational task; and the first edge node sends the computation result of the first computational task to the first terminal device.

With reference to the second aspect, in some implementations of the second aspect, that the first edge node determines a second offloading decision based on the states of one or more tasks includes: The first edge node updates a third state of the first edge node based on the states of the one or more tasks to obtain a fourth state of the first edge node, where the third state is a state before the first edge node receives the states of the one or more tasks; the first edge node determines a cost value of the first edge node based on the fourth state, where the cost value of the first edge node is an overhead for allocating the computing resources by the first edge node to the one or more computational tasks; and the first edge node determines the second offloading decision based on the cost value of the first edge node.

With reference to the second aspect, in some implementations of the second aspect, that the first edge node determines a cost value of the first edge node based on the fourth state includes: The first edge node determines the cost value of the first edge node based on the fourth state by using a first cost function and a second cost function in a MADRL algorithm, where the first cost function includes an offload overhead function and a local computation overhead function, the offload overhead function is used to determine offloading overheads of the one or more tasks, and the local computation overhead function is used to compute local overheads of the one or more tasks; the second cost function includes an average cost function and a fair cost function, the average cost function is used to determine an average overhead of the one or more tasks based on the offloading overheads and the local overheads of the one or more tasks, and the fair cost function is used to determine a fair cost of the first edge node based on a quantity of second terminal devices that use computing resources of the first edge node; and the first edge node determines the cost value of the first edge node based on the average overhead of the one or more tasks and the fair cost of the first edge node.

A plurality of factors may be weighed for the cost value of the edge node. A decision item of the edge node ensures average experience of a served terminal device and improves fairness of resource utilization of the terminal device. That is, this ensures efficient resource allocation and avoids an excessively small quantity of served users, so that the cost value of the edge node reflects a more comprehensive actual environment.

With reference to the second aspect, in some implementations of the second aspect, that the first edge node determines the second offloading decision based on the cost value of the first edge node includes: The first edge node iteratively updates a state of the first edge node and the cost value of the first edge node based on the MADRL algorithm; and when the MADRL algorithm meets a termination condition, the first edge node determines the second offloading decision based on a minimum cost of the first edge node.

According to a third aspect, the embodiments may provide a communication apparatus. The communication apparatus has a function of implementing the method according to the first aspect and any one of the possible implementations of the first aspect. The function may be implemented by hardware or may be implemented by hardware executing corresponding software. The hardware or the software includes one or more units corresponding to the foregoing functions.

According to a fourth aspect, the embodiments may provide a communication apparatus. The communication apparatus has a function of implementing the method according to the second aspect and any one of the possible implementations of the second aspect. The function may be implemented by hardware or may be implemented by hardware executing corresponding software. The hardware or the software includes one or more units corresponding to the foregoing functions.

According to a fifth aspect, the embodiments may provide a communication apparatus. The communication apparatus includes an interface circuit and a processor. The interface circuit is configured to receive computer code or instructions and transmit the computer code or the instructions to the processor. The processor runs the computer code or the instructions, and the method in the first aspect or any implementation of the first aspect is implemented.

According to a sixth aspect, the embodiments may provide a communication apparatus. The communication apparatus includes an interface circuit and a processor. The interface circuit is configured to receive computer code or instructions and transmit the computer code or the instructions to the processor. The processor runs the computer code or the instructions, and the method in the second aspect or any implementation of the second aspect is implemented.

According to a seventh aspect, the embodiments may provide a communication device. The communication device includes at least one processor, and the at least one processor is coupled to at least one memory. The at least one memory is configured to store a computer program or instructions. The at least one processor is configured to invoke the computer program or the instructions from the at least one memory and run the computer program or the instructions, so that the communication device performs the method in the first aspect or any possible implementation of the first aspect.

In an example, the communication device may be a terminal device.

According to an eighth aspect, the embodiments may provide a communication device. The communication device includes at least one processor, and the at least one processor is coupled to at least one memory. The at least one memory is configured to store a computer program or instructions. The at least one processor is configured to invoke the computer program or the instructions from the at least one memory and run the computer program or the instructions, so that the communication device performs the method in the second aspect or any possible implementation of the second aspect.

In an example, the communication device may be an edge node.

According to a ninth aspect, the embodiments may provide a non-transitory computer-readable storage medium. The non-transitory computer-readable storage medium stores computer instructions. When the computer instructions are run on a computer, the method according to the first aspect or any one of the possible implementations of the first aspect is implemented.

According to a tenth aspect, the embodiments may provide a non-transitory computer-readable storage medium. The non-transitory computer-readable storage medium stores computer instructions. When the computer instructions are run on a computer, the method according to the second aspect or any one of the possible implementations of the second aspect is implemented.

According to an eleventh aspect, the embodiments may provide a computer program product. The computer program product includes computer program code. When the computer program code is run on a computer, the method according to any one of the first aspect or the possible implementations of the first aspect is implemented.

According to a twelfth aspect, the embodiments may provide a computer program product. The computer program product includes computer program code. When the computer program code is run on a computer, the method according to any one of the second aspect or the possible implementations of the second aspect is implemented.

According to a thirteenth aspect, the embodiments may provide a wireless communication system. The wireless communication system includes the communication device according to the seventh aspect and the communication device according to the eighth aspect.

DETAILED DESCRIPTION OF THE EMBODIMENTS

The following describes the embodiments with reference to accompanying drawings.

The embodiments may be applied to various communication systems, for example, a 5th generation (5G) system such as a long term evolution (LTE) system, an LTE frequency division duplex (FDD) system, an LTE time division duplex (TDD) system, a universal mobile telecommunications system (UMTS), and a new radio (NR) system, a satellite communication system, another future evolved communication system, vehicle-to-everything (V2X), where the V2X may include vehicle to network (V2N), vehicle to vehicle (V2V), vehicle to infrastructure (V21), vehicle to pedestrian (V2P), and the like, long term evolution-vehicle (LTE-V), internet of vehicles, machine type communication (MTC), internet of things (IoT), long term evolution-machine (LTE-M), machine-to-machine (M2M), and the like.

Figure 1:
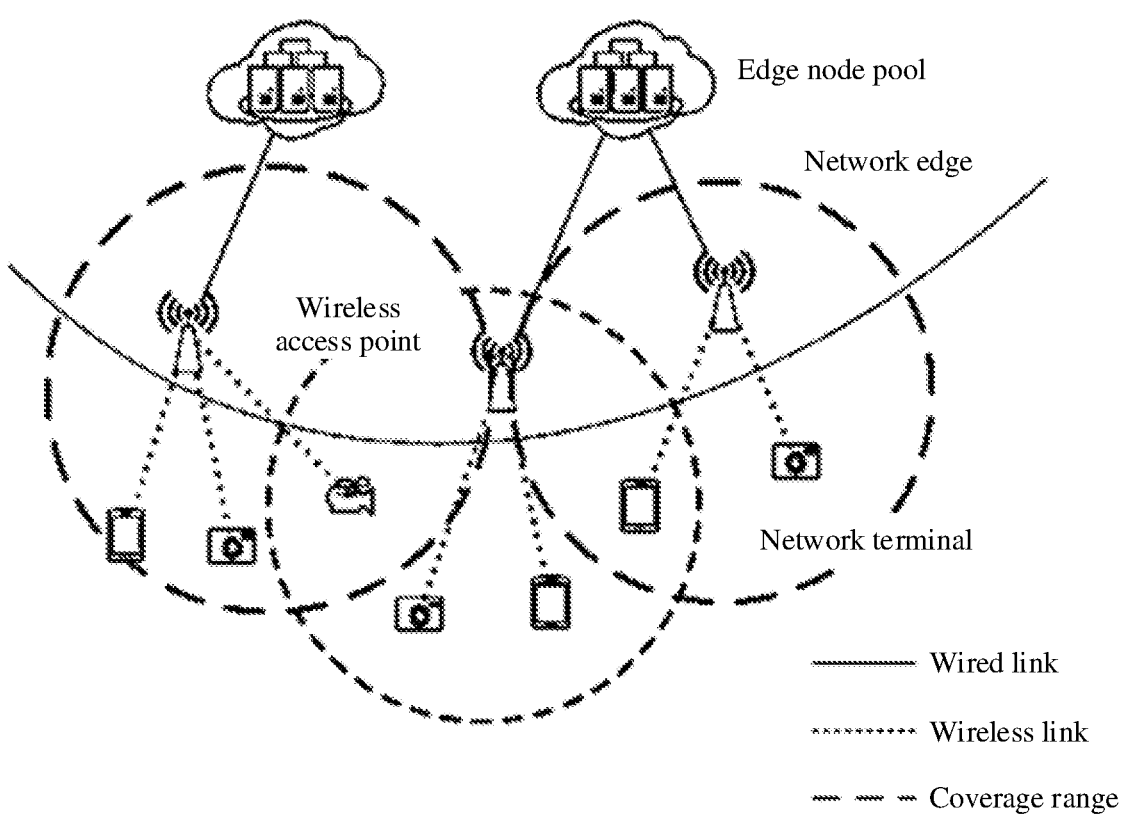
FIG. 1 is a schematic diagram of a system architecture to which an embodiment is applicable.

FIG. 1 is a schematic diagram of a system architecture to which an embodiment may be applicable. As shown in FIG. 1, the system architecture includes at least one terminal device, at least one radio access node, and at least one edge node. The terminal device accesses, by using a plurality of wireless access manners (including, but not limited to, cellular and Wi-Fi) and corresponding wireless access points, a resource pool (that is, a resource pool formed by edge nodes) that is located at an internet edge (that is, a network edge) node.

The edge node is a service platform constructed at the network edge side close to the terminal device, provides storage, computing, network, and other resources, and transfers some key service applications down to an access network edge, to reduce width and delay loss caused by network transmission and multi-level forwarding. Devices having a computation capability at the network edge may be uniformly abstracted as edge nodes. However, the embodiments may not relate to functions of abstraction, management, and allocation of computing resources in the edge node, and may point out a policy in which the edge node allocates computing resources to the terminal device as a whole.

It should be understood that the terminal device, the edge node, and a wireless channel in the system architecture shown in FIG. 1 have the following stipulations based on an actual situation: At each moment, a single terminal device can access only one wireless channel, and obtain a computing resource of one edge node through the channel; a single wireless access point can access one (or more) edge nodes in the wireless channel, and provide one wireless channel for the terminal device to access; and a single edge node can provide computing resources for the terminal device by using a plurality of wireless access points at the same time, and can provide computing resources for a plurality of terminal devices at the same time. For ease of detailed description in the following, the following definitions are provided: A terminal device D, an edge node N, and a wireless channel Z may be respectively represented as $D=\{1, 2, \ldots, d\}$, $i\in D$, $N=\{1, 2, \ldots, n\}$, $j\in N$, $Z=\{1, 2, \ldots, z\}$, and $k\in Z$; and the edge node and the wireless channel for communication that are connected to the terminal device are respectively $conn_i\in\{0\}\cup N$ and $link_i\in\{0\}\cup Z$.

A terminal device in the embodiments may alternatively be referred to as: user equipment (UE), a mobile station (MS), a mobile terminal (MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

The terminal device may be a device that provides voice/data connectivity for a user, for example, a hand-held device or a vehicle-mounted device that has a wireless connection function. Currently, some examples of the terminal device are a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a cellular phone, a cordless telephone set, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 6G network, a terminal device in a future evolved public land mobile network (PLMN), and/or any other suitable device configured to perform communication in a wireless communication system. This is not limited in this embodiment.

The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart accessories for monitoring physical signs.

In addition, the terminal device in the embodiments may alternatively be a terminal device in an internet of things system. IoT is an important part of future development of information technologies. A feature of the IoT may be connecting things to networks using a communication technology, to implement an intelligent network for interconnection between a person and machines or between things.

In addition, in this embodiment, the terminal device may further include a sensor, for example, an intelligent printer, a train detector, or a gas station. Main functions of the terminal device include collecting data (by some terminal devices), receiving control information and downlink data from a network device, sending an electromagnetic wave, and transmitting uplink data to the network device.

To facilitate understanding of the embodiments, the following first briefly describes the terms.

1. Edge computing: evolves from a concept of "cloud computing" and is a new distributed computing mode. In the edge computing, computing and storage resources are provided for users at an edge of the internet. The "edge" is defined as any network location on a path between a terminal device and a cloud data center, and these locations are closer to a user than the cloud data center. Generally speaking, the "edge computing" means that resources are deployed near a boundary between a wireless link and a wired network, that is, near a wireless access point. The edge computing features a lower delay, lower energy consumption, bandwidth saving, high privacy, and more intelligent. As a key enabling technology for implementing the vision of the internet of things and 5G, the edge computing (and its derivative concepts) is at an intersection of a computing mode and network communication and is irreplaceable in meeting various service requirements and improving user experience.

2. Computation offloading: refers to an action that a computing device transfers a resource intensive computational task to a separate processor or another device. The computing device may be a terminal device, the resource intensive computational task may be a task that can be completed only after computation, and a transferred location may be an edge node at a network edge. A process of the computation offloading may be as follows: The terminal device offloads the computational task to the edge node, the edge node processes the computational task, and the terminal device receives a computation result of a corresponding task of the edge node.

Similar to a computation offloading method in the cloud computing, a possible manner of improving terminal performance through the edge computing may be as follows: The terminal device offloads the computation-intensive task to the network edge node for computing and receives a corresponding running result to achieve computation offloading. For the edge computing, two aspects may need to be considered. In one aspect, the terminal device has disadvantages such as a low computation capability, high energy sensitivity, and a small quantity of supported functions. In the other aspect, the network edge also has phenomena such as scattered computing resources, different power supply manners, and diversified system architectures. Therefore, how to manage and allocate a computation capability of the network edge becomes an important issue that urgently needs to be paid attention to.

Figure 2:
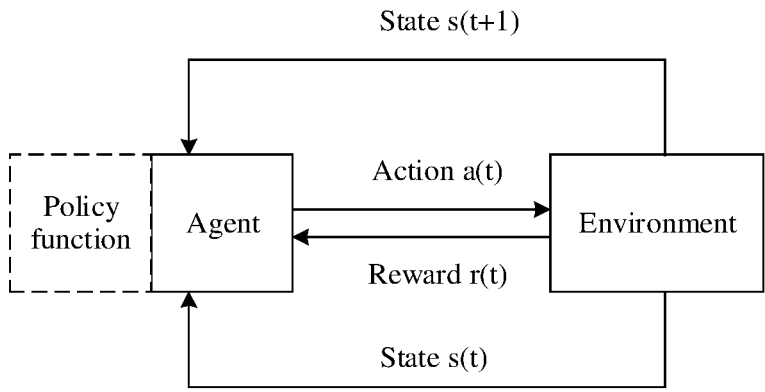
FIG. 2 is a schematic diagram of a training process of reinforcement learning.

3. Deep reinforcement learning (DRL): Reinforcement learning is a field of machine learning. FIG. 2 is a schematic diagram of a training process of reinforcement learning. As shown in FIG. 2, the reinforcement learning includes four elements: an agent, an environment, a state, an action, and a reward. An input of the agent is the state, and an output is the action. In the conventional technology, a training process of the reinforcement learning is as follows: The agent interacts with the environment for a plurality of times to obtain actions, states, and rewards of the interactions; and a plurality of groups of (actions, states, and rewards) are used as training data to train the agent once. The foregoing process is used to perform a next round of training on the agent until a convergence condition is met. A process of obtaining an action, a state, and a reward of one interaction is shown in FIG. 1. A current state $s(t)$ of the environment is input to the agent, an action $a(t)$ output by the agent is obtained, and a reward $r(t)$ of the current interaction is computed based on a related performance indicator of the environment under the action $a(t)$. In this way, the state $s(t)$, the action $a(t)$, and the reward $r(t)$ of the current interaction are obtained. The state $s(t)$, the action $a(t)$, and the reward $r(t)$ of the current interaction are recorded for subsequent training of the agent. A next state $s(t+1)$ of the environment under the action $a(t)$ is further recorded, to implement a next interaction between the agent and the environment. Deep reinforcement learning is obtained by combining the reinforcement learning and deep learning. The deep reinforcement learning still conforms to a framework of interaction between a body and the environment in the reinforcement learning. A difference is that in the agent, a deep neural network is used to make a decision. The deep reinforcement learning is an artificial intelligence method that integrates the deep learning and the reinforcement learning. It is widely used in complex problems such as dynamic decision-making, real-time control, and image perception, and some DRL-based computation offloading methods are generated. Algorithms used in the existing method for computation offloading include, but are not limited to: a deep Q network (DQN), a deep deterministic policy gradient (DDPG), and an Actor-Critic (actor-judge) algorithm. A DRL-based method model includes an agent and an environment interacting with the agent. The terminal device is considered as a decision-making and execution entity. The terminal device senses a current state of the environment by using a deep neural network, interacts with the environment in a manner similar to the reinforcement learning, and adjusts a policy. Finally, after a plurality of iterative sensing-adjustment processes, the terminal device gradually approaches an optimal policy.

4. Multi-agent deep reinforcement learning (MADRL): is a method that integrates deep learning and reinforcement learning in a multi-agent system. The deep learning can effectively extract features from information by using a deep neural network. The reinforcement learning continuously enhances a decision-making capability by dynamically interacting with the environment. The multi-agent system emphasizes that the agent focuses on both environmental factors and mutual impact of decisions between the agents. Therefore, the MADRL is suitable for describing a decision-making and interaction process of a plurality of agents in a complex environment and is widely used in many fields such as robot collaboration, distributed control, and collaborative decision-making. The MADRL may build a system including a plurality of agents, where each agent uses a deep reinforcement learning (DRL) method to describe its decision-making and interaction process. Compared with common (single-agent) deep reinforcement learning, an optimal solution of each agent in the multi-agent system is not only restricted by an environment variable, but also restricted and affected by an action of another agent.

5. Multi-agent deep deterministic policy gradient (MADDPG) algorithm: is a typical multi-agent deep reinforcement learning algorithm and is an extension and expansion of a deep deterministic policy gradient (DDPG) algorithm in a multi-agent. Each agent runs a DDPG model. The MADDPG algorithm implements a decision-making process of the multi-agent by using a centralized training and distributed execution method. During training, decision-making information of another agent needs to be known, while during execution, only local information is required for decision-making.

6. Computational power control: refers to an action that a terminal device adjusts computational power in a process of processing a computational task to balance a service delay and energy consumption. In edge computing, terminal devices are energy-limited, and have differences in energy consumption sensitivity. Therefore, controlling computational power of a local processing task can effectively improve user experience.

There may be two types of decision-making entities in problems about edge computation offloading: a terminal device (a computation offloading party) and an edge node (a resource provider). When generating a computation-intensive task, the terminal device determines whether to locally process the task (that is, computation offloading is not performed) on the terminal device or pack the computational task and transmit the computational task to the edge node through a network, and receives a result returned by the edge node after processing the task. The edge node needs to dynamically collect current available resources based on a current environment condition and a terminal status and allocate a computing resource to a required terminal device. A resource-limited terminal device needs to determine, based on current states such as a radio environment, a computation capability, and an energy mode, a correspondence between a to-be-processed computational task in the terminal device and an available computing resource, that is, deciding where and in which manner a computational task is executed. Local execution avoids an overhead caused by transferring the task in the network. In addition, the computation offloading reduces a time and energy consumption for executing the computational task.

Figure 3:
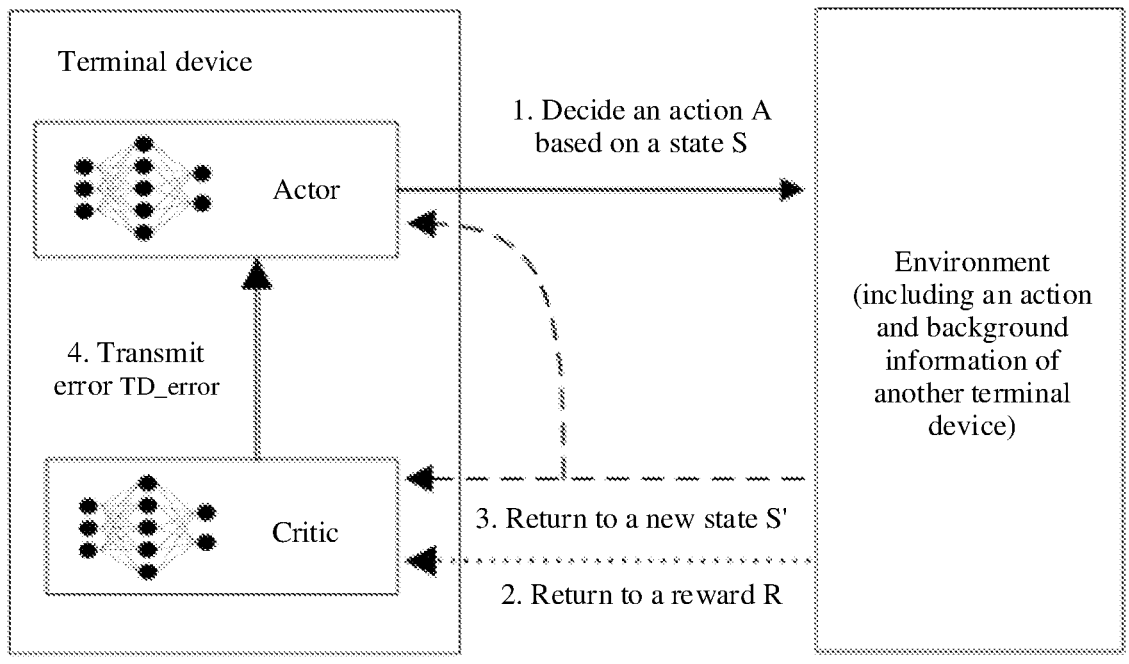
FIG. 3 is a schematic diagram of a DRL-based computation offloading method.

FIG. 3 is a schematic diagram of a DRL-based computation offloading method.

The Actor-Critic algorithm is used as an example. There may be a plurality of terminal devices in a coverage area of a wireless base station, and each terminal device has a computation-intensive and delay-sensitive task that needs to be completed. The terminal device may choose to process the computational task locally or may choose to offload the computational task to a remote end by using a base station. Because a wireless transmission rate in the computation offloading process is interfered with by background noise and communication of another terminal device, the terminal device needs to make a decision by weighing benefits of local processing and computation offloading. A computation procedure of the Actor-Critic algorithm is briefly described herein. When the terminal device runs the Actor-Critic algorithm, two neural networks Actor and Critic may be maintained at the same time and may respectively correspond to two sets of policy parameters. An input of the Actor is the current state, and an output is a policy action that can obtain the highest reward in the current state. An input of the Critic is a next state and reward returned by the current state and environment, and an output is an error (TD_error) between the reward returned by the environment and a reward estimated by the Critic.

With reference to FIG. 3, a training process of the Actor-Critic algorithm may be described as follows: (1) The Actor first decides an action A based on a current state S of the environment; (2) the environment returns to a next state S' and reward R based on the state S and the action A; (3) the Critic obtains an estimated error TD_error based on the current state S, the next state S', and the reward R, and adjusts a policy parameter of the Critic based on the error; (4) the Actor also adjusts a policy parameter of the Actor based on the state S, the action $A_i$ and the error TD_error; and (5) the terminal assigns a value of the current state S to the next state S', that is, S=S', and repeats a process from step (1) to step (4) to continue training. Correspondingly, when the Actor-Critic-based solution method may be performed, only the Actor needs to be used to determine, based on the current state S of the environment, whether to perform the action A of offloading.

In the single-agent DRL, it is assumed that a decision-making environment is stable and does not change due to a decision itself. This is difficult when a plurality of terminal devices may decide whether to perform computation offloading at the same time. The decision of whether computation offloading is performed may correspond to a contention relationship between a wireless channel and an external computing resource of the terminal device and may affect a decision reward. Therefore, for each terminal device, a decision-making process of the terminal device may cause a decision change of another terminal device, thereby causing a dynamic change of the environment in the DRL. When the assumption of the DRL for environment stability is not true, an algorithm convergence is no longer stable, which leads to performance degradation of the solution method.

In addition, the existing DRL-based method focuses on the interaction process between the agent and the environment and pays less attention to an interaction mechanism and information content between the agents. As a result, it is difficult for the agent to properly obtain more valid information from the environment, thereby limiting further improvement of decision-making benefits.

Figure 4:
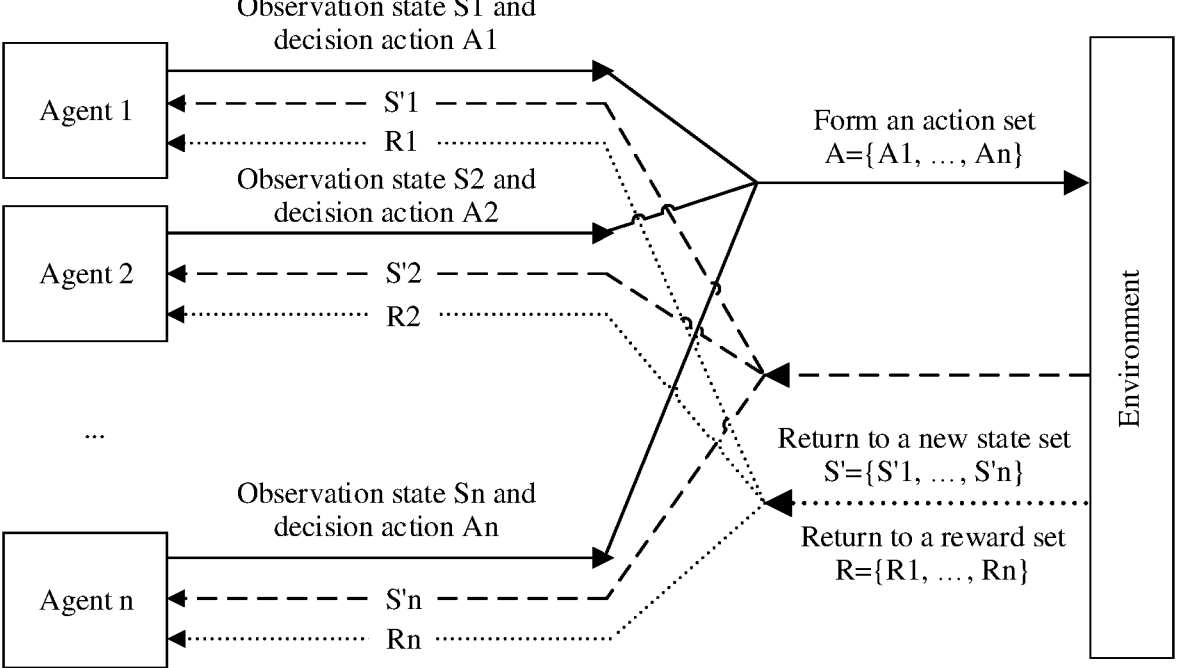
FIG. 4 is a schematic diagram of an interaction process between an agent and an environment in MADRL.

FIG. 4 is a schematic diagram of an interaction process between an agent and an environment in MADRL. Similar to the single-agent DRL, each agent in the MADRL still adopts a set of DRL methods, that is, the set of DRL methods includes one sensing and control system, and includes five parts: an agent, a decision-making action, a state, a reward, and an environment. The agent is a decision-making entity in the system. An input S' in FIG. 4 is a state of reflecting a current environment for the agent, and an output A is an action performed by the agent in a given state. All agents share the same environment, but actions, states, and rewards are usually different. The environment is used to interact with a plurality of agents, maintain a current state set of all the agents, display corresponding current states to the agents, and generate corresponding rewards and a next state set based on actions of all the agents.

A training process of the MADRL is a process of obtaining an optimal policy of the agent in a given environment. This process is implemented through continuous interaction between the foregoing plurality of agents and the environment. Each agent obtains a high-dimensional observation state S from the environment, senses and analyzes the observation state by using a method similar to deep learning (DL), evaluates each feasible action based on an expected return, and makes a decision in the current state according to the policy. Finally, the environment reacts to decision-making actions of all the agents in a unified manner, to obtain a next state set S' and a corresponding reward set R. The preceding processes are continuously repeated, and the multi-agent can finally obtain the optimal policy in the given environment.

Policy learning in the MADRL is a centralized process, which is different from that of the single-agent DRL. During decision-making, each agent can know policies of all the agents for the current observation state and can learn a decision reward set R of all the agents and a next state set. In this way, non-stationarity caused by mutual impact of agent decisions in a learning process can be avoided. In a policy inference process of the MADRL, each agent makes a decision independently based on its observation state of the environment. The policy learning and inference process described above is an artificial intelligence method similar to group behavior.

To enable the agent (that is, the terminal device) to obtain more valid information from the environment and better determine whether to perform a basis decision of offloading the computational task, the embodiments may provide a computation offloading method based on the multi-agent deep reinforcement learning. Two main indicators of a service delay and energy consumption may be optimized and weighed, thereby further improving decision-making benefits of the computation offloading task, enhancing user experience, and improving resource utility.

It can be understood from the foregoing that, in a process in which the terminal device performs computation offloading, benefits of the terminal device include performance in two phases: network transmission and task computation. A time consumed by the task computation is affected by resource allocation of the edge node, and a processing cost of the network transmission includes two parts: wireless link transmission and wired link transmission. It is considered that a wireless network environment in an end-edge (terminal device-edge node) interaction is more complex, and environment impact and transmission interference are more serious, the embodiments may focus on environmental noise and bandwidth contention phenomena in a wireless link. A range of the environmental noise includes background noise and communication interference caused on the channel by another device that does not participate in the computation offloading decision, and a range of the bandwidth contention includes mutual communication interference between all terminal devices that use the channel and participate in the computation offloading decision. In addition, mutual interference between signals of access points has been fully considered during design and deployment of the current radio environment. Therefore, deployment of access points may be proper by default, and communication interference between terminal devices may become a main factor that affects a network transmission rate. In a scenario, a processing time of the computation offloading process may be at a second level or below. In this time granularity, movement of the terminal device may predict a status of a connection between the edge node and the wireless access point. Therefore, when the computation offloading decision is considered, a status of a link between the terminal device and the edge node and a status of a link between the terminal device and the wireless access point do not change by default during the decision-making and execution process of the computation offloading.

Figure 5:
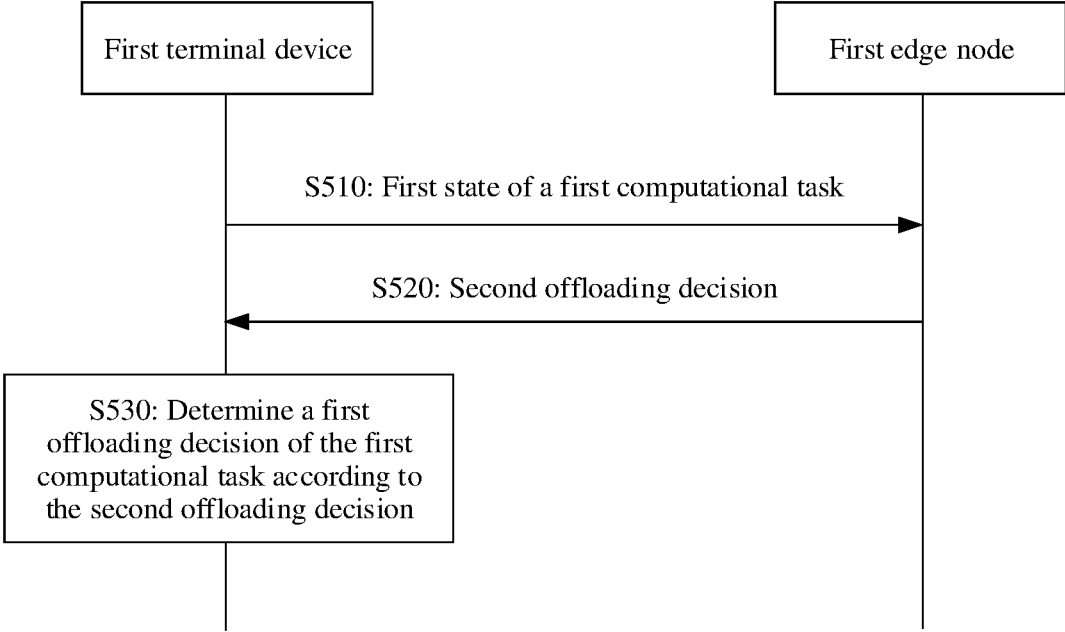
FIG. 5 is a schematic flowchart of a computation offloading method.

FIG. 5 is a schematic flowchart of a computation offloading method.

S510: A first terminal device sends a first state of a first computational task to a first edge node.

Correspondingly, the first edge node receives the first state sent by the first terminal device.

It should be noted that, because one edge node usually serves one or more terminal devices, in addition to receiving first state information sent by the first terminal device, the first edge node may further receive a state of a computational task sent by another served terminal device. For example, if the first edge node is an edge node j, a terminal device served by the edge node j may be represented as $i \in D$ and $conn_i = j$ (that is, an example of a second terminal device).

A state of a computational task of any terminal device may include, but is not limited to: a length of a data stream of the computational task, a time that needs to be consumed by the computational task, a penalty value of the computational task, another parameter related to the computational task, and the like.

As an example rather than a limitation, the state of the computational task may be defined in the following manner. A state of each computational task can be expressed as $M=\{mt, mc, md, mp\}$. mt represents a length of a data stream required for transmitting the computational task, and a unit is byte; mc represents a quantity of clock cycles required for processing the computational task, and a unit is Hz; md represents a maximum time that can be accepted by the terminal device from starting to execute the computational task to obtaining a computation result; md is a fixed value related to the task, and when the task is generated, the fixed value is provided by an application that generates the task, and a unit is second; mp represents a penalty value caused when the computational task cannot be successfully processed, and is some of benefits computed by the terminal device and the edge node. For example, the first state of the first computational task may be represented as $M_1=\{mt_1, mc_1, md_1, mp_1\}$.

The first edge node determines a second offloading decision based on received states of one or more computational tasks, where the second offloading decision includes allocation information about computing resources to terminal devices served by the first edge node.

Optionally, the first edge node may determine the second offloading decision by using an MADRL algorithm based on the received states of the one or more computational tasks. A decision-making process of the MADRL algorithm is not described herein and may be described in detail in a flowchart corresponding to FIG. 6A and FIG. 6B.

S520: The first terminal device receives the second offloading decision sent by the first edge node.

Correspondingly, the first edge node sends the second offloading decision to the first terminal device.

S530: The first terminal device determines a first offloading decision of the first computational task according to the second offloading decision.

The first offloading decision indicates the first terminal device to locally compute the first computational task or indicate the first terminal device to offload the first computational task to the first edge node for computing.

Optionally, the first offloading decision may further include second operating power. The second operating power is operating power that is determined by the first terminal device based on the MADRL algorithm and that is used for locally computing the first computational task.

It should be noted that when the first terminal device offloads the first computational task to the first edge node for computing, the operating power of the terminal device is a sleep power of the first terminal device.

Optionally, the first terminal device may determine the first offloading decision of the first computational task according to the received second offloading decision by using the MADRL algorithm. A decision-making process of the MADRL algorithm is not described herein and may be described in detail in a flowchart corresponding to FIG. 6A and FIG. 6B.

Content of the interaction process and the exchange information between the terminal device and the edge node in the computation offloading process may be described. The terminal device and the edge node each can have a wider capability of sensing the environment in actual decision-making, which can effectively improve decision-making benefits of the terminal device and the edge node. In addition, an information exchange process is simple and easy to implement.

Figure 6A:
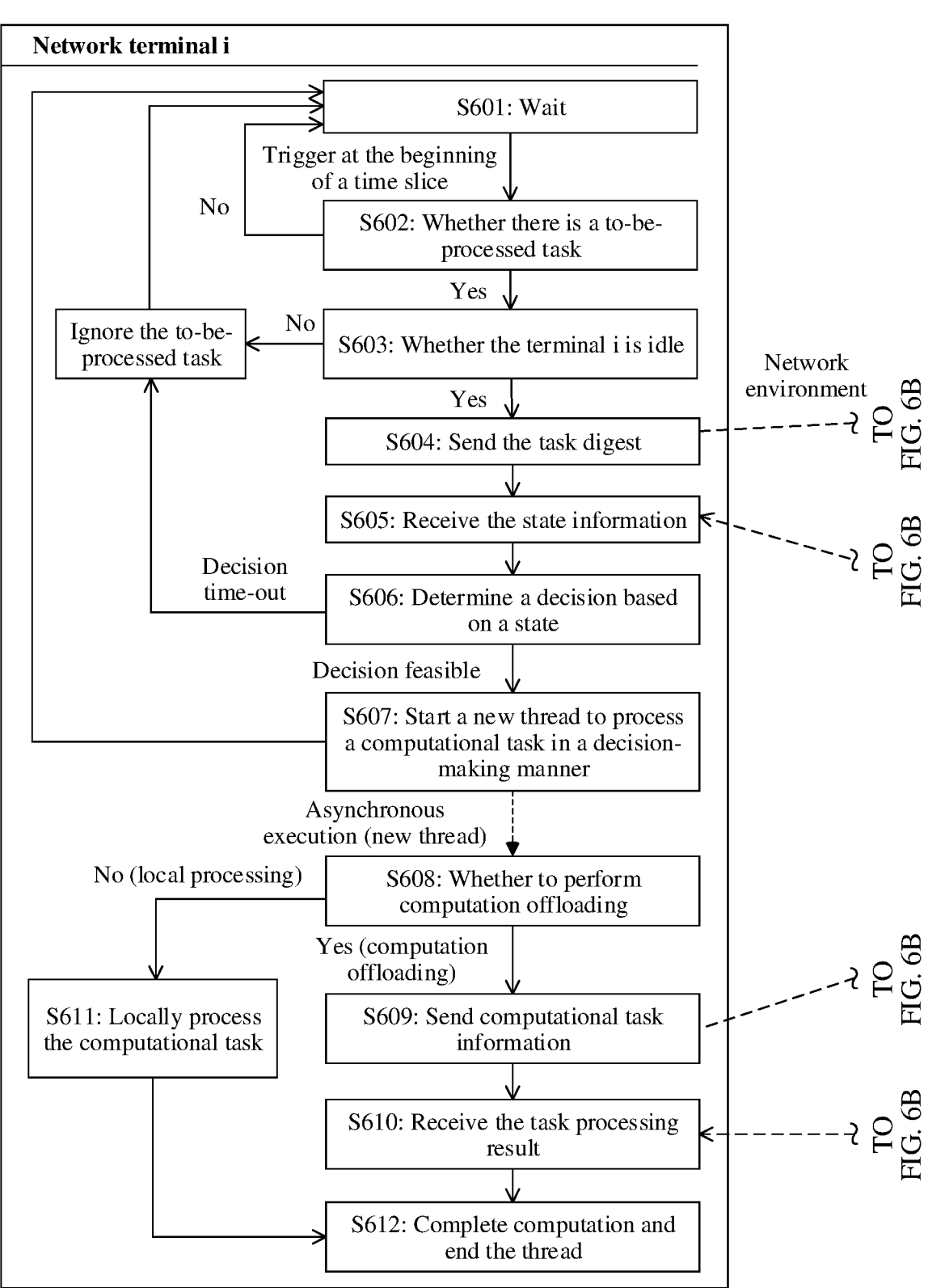
FIG. 6A and FIG. 6B are a schematic flowchart of a computation offloading method.
Figure 6B:
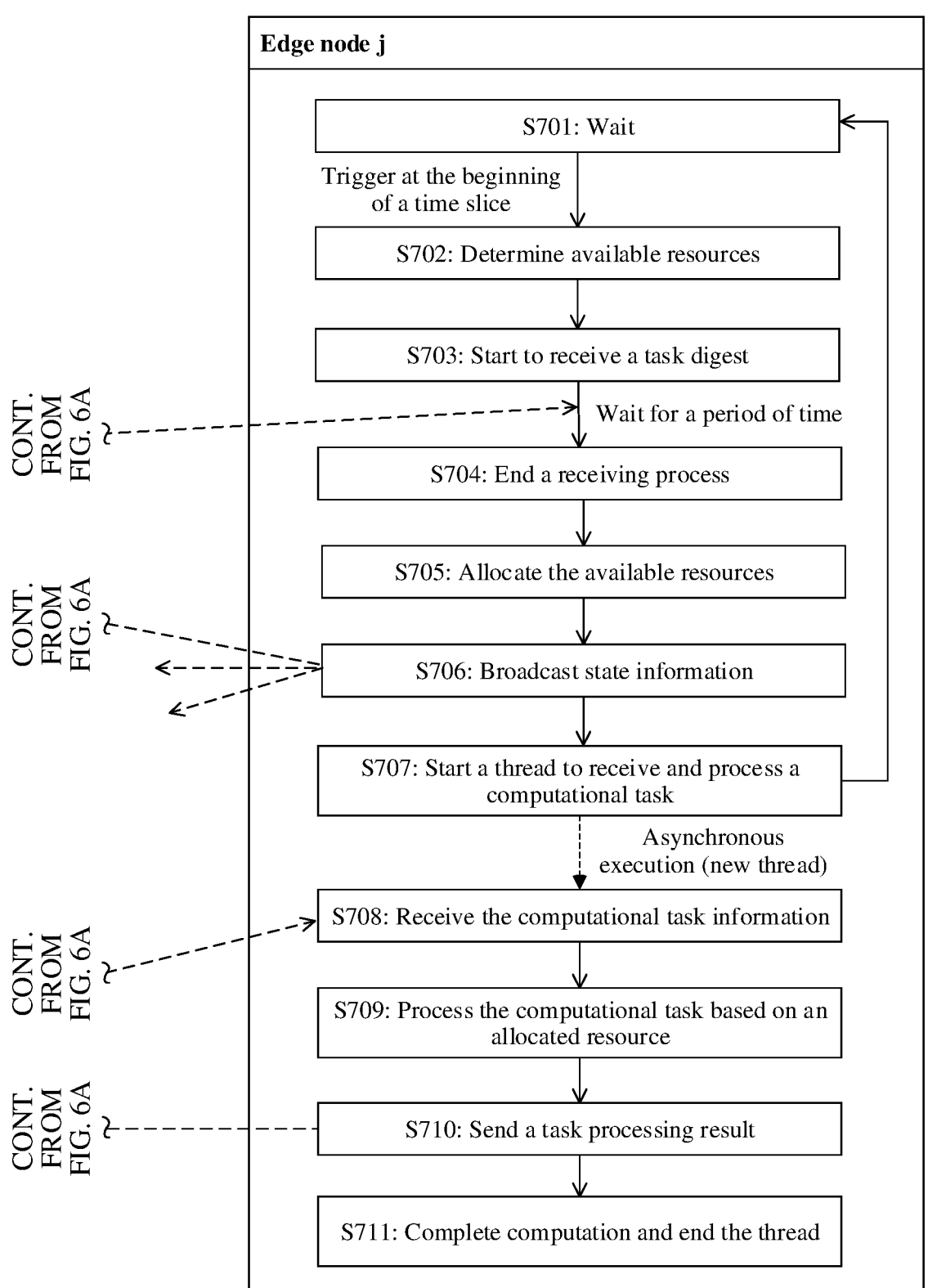

FIG. 6A and FIG. 6B are a schematic flowchart of a computation offloading method. In this procedure, a decision-making process of a terminal device and an edge node is a closed-loop procedure. A static state of the procedure lies in a "waiting" step, and an execution procedure is triggered at beginning of each time slice.

There may be two types of decision-making entities: one or more terminal devices and one or more edge nodes. A terminal device i and an edge node j are used as an example for description. An implementation process of the procedure includes a decision-making process and an execution process of determining computation offloading by the terminal device i and the edge node j through MADRL algorithm-based offline training. The edge node j provides computing resources for the terminal device i, that is, $conn_i=j$.

It should be understood that an offline training process of the MADRL algorithm may be performed at any location, provided that a trained parameter model of the edge node is deployed on a corresponding edge node, and a trained parameter model of one or more terminal devices is deployed on each terminal device, to implement the MADRL algorithm-based computation offloading method.

The computation offloading process of the terminal device i is as follows:

S601: A decision-making process of the terminal device i (that is, an example of a first terminal device) is in a waiting state, and S602 is performed at the beginning of each time slice.

A MADRL algorithm-based time modeling manner in this method is the same as a time modeling manner in another related method. In this embodiment, a continuous time is divided into time slices that have a length of $\delta(\delta>0)$ seconds and do not overlap with each other. In actual application, the length $\delta$ of the time slice may be determined based on a status of a to-be-offloaded service. This is not limited.

S602: The terminal device i determines whether there is a to-be-processed task, and if no, goes to S601; otherwise, performs S603.

S603: The terminal device i determines whether a computational task is being processed currently.

An execution process in which the terminal device i processes the computational task is a new thread started in the decision-making process, and a procedure of the computational task is executed in the new thread based on a decision result. It should be understood that the terminal device i processes one computational task in a same time slice, and a process of processing a single computational task may last for several time slices (that is, processing rounds). It is assumed that impact of a queue mechanism on the decision-making action is not considered during task generation and execution, that is, if a new computational task event is generated in a process of processing the computational task, the terminal device ignores the new task and generates a corresponding task penalty value. Similarly, if the terminal device finds, when the decision-making action is performed, that execution duration of the task exceeds a limit, the terminal device also ignores the task and generates a penalty value. For the penalty value of the task, refer to the definition of mp in S510.

A number of rounds (that is, the processing rounds) in which a time slice of the single computational task processed by the terminal device is in a busy state may be computed in the following manner $$\text{round} = \left\lceil \frac{T}{\delta} \right\rceil.$$

A processing time T refers to duration from a time slice in which the terminal device decides how to execute the task to a time slice in which the task is executed. $\lceil \cdot \rceil$ is a ceiling function, that is, represents rounding up. Computation of duration for locally processing the task and offloading the computational task is described in detail in the following [benefit indicator], and details are not described herein.

The terminal device i first determines, in each time slice, whether there is the to-be-processed task (S602), and if there is no new task and current $round_i$ is not equal to 0, the terminal device performs $round_i=\max (round_i-1,0)$ at the end of each time slice. If there is a new task, for example, the new task is a computational task X, the terminal device i continues to determine whether the current $round_i$ is equal to 0. When the current $round_i$ is not equal to 0, it indicates that the system is currently processing a task, the terminal device i ignores the to-be-processed computational task X, generates a corresponding task penalty value, and goes to S601. If the current $round_i$ is equal to 0, it indicates that no task is currently being executed in the system, and the computational task X may be performed, so that the terminal device i goes to S604.

S604: The terminal device i sends a task digest to the edge node j (an example of a first edge node).

Correspondingly, in S703, the edge node j receives the task digest sent by the terminal device i.

The task digest includes a state $M_i$ of the to-be-processed computational task X (that is, an example of a first state of a first computational task). When determining that the task digest is successfully sent or exceeds a period of time, the terminal device i performs S605.

The state $M_i$ of the computational task X may be expressed as $M_i=\{mt_i, mc_i, md_i, mp_i\}$. For example, in S602, when the terminal device i determines, at the beginning of the time slice, that the terminal device i has no to-be-processed computational task, it can be expressed as $M_0=\{0,0,0,0\}$.

Optionally, the task digest further includes current channel noise $w_i$ and a current channel gain $H_i$. For example, the terminal device i may send the foregoing information to the edge node j in a form of a network packet, and a message content form is $\cup_i=\{M_i, H_i, w_i\}$.

S605: The terminal device i receives state information broadcast by the edge node j.

Correspondingly, in S706, the edge node j broadcasts the state information to a served terminal device by using a connected wireless access point.

The state information includes a resource allocation policy (that is, an example of a second offloading decision) of the edge node j for the terminal device served by the edge node j. For content of the state information broadcast by the edge node j, refer to descriptions in S705. Details are not described herein again. For example, a state content of the edge node j may be $\cup_{d+j}=\{a_{(j,1)}, a_{(j,2)}, \ldots, a_{(j,d)}\}$. Herein, a decision sequence number d+j of the edge node is used to distinguish from the decision sequence number i of the terminal device. $a_{(j,i)} \in \{0, 1, \ldots, a_{(j,avail)}\}$ represents a quantity of computing resources allocated by the edge node j to the terminal device i, 0 indicates that no computing resource is allocated, and $a_{(j,avail)}$ indicates that all currently available resources are allocated.

S606: The terminal device i determines an action decision (that is, an example of a first offloading decision) by using an MADRL algorithm based on the state information broadcast by the edge node j and a static state of the terminal device i (including partial observation of the terminal device i on the environment).

At the beginning of the time slice, the static state $X_i$ of the terminal device i itself and corresponding static state space are shown as follows. It should be noted that the static state is not a state in which a multi-agent (that is, a plurality of terminal devices) makes a decision in a deep reinforcement learning algorithm.

The static state of the terminal device i at the beginning of the time slice may be $X_i=(M_i,conn_i, link_i, w_i, round_i)$. The static state space corresponding to the terminal device refers to state space formed by partial observation of a problematic environment when the terminal device and the edge node do not exchange the state information, that is, the static state space corresponding to the terminal device i may be represented as $$x_i = \{M_0, M_{i\_1}, M_{i\_2}, \ldots, M_{i\_max}\} \times \{\{0\} \cup N\} \times$$

$$\{\{0\} \cup Z\} \times \{0, w_{i\_1}, w_{i\_2}, \ldots, w_{i\_max}\} \times \left\{0, 1, \left\lceil \frac{MD_i}{\delta} \right\rceil \right\},$$

where $M_0$ indicates no task, and $M_{i\_1}, M_{i\_2}, \ldots, M_{i\_max}$ is all types of computational tasks that may be generated by the terminal device i. 0, $w_{i\_1}, w_{1\_2}, \ldots, w_{i\_max}$ is a discretized environmental interference degree, and a granularity may be determined based on a fluctuation range of the environmental interference. $MD_i=\max (md_{i\_1}, md_{i\_2}, \ldots, md_{i\_max})$, that is, a maximum value of execution duration of all computational tasks of the terminal device i is used.

The state of the terminal device i changes the static state $X_i$ to $X'_i=X_i\cup a_{(j,i)}$ (that is, an example of a second state of the first computational task) based on a received resource allocation of the edge node j.

The network terminal computes, based on a new state $X'_i$ and based on a benefit indicator in the MADRL algorithm-based offline training, a cost value of executing the first computational task until an algorithm termination condition is met, and obtains a final action decision $A_i=\{c_i\}$ based on a minimum cost value of the first computational task, where $c_i \in \{0,1\}$ indicates whether the terminal device i executes the computational offloading decision for the computational task, 0 indicates that the terminal device i locally executes the computational task X, and 1 indicates that the terminal device i offloads the computational task X to the edge node j for computing. The MADRL-based computation offloading decision-making process is completed. For details about the benefit indicator, refer to the following sections. This is not described herein.

Optionally, the termination condition includes a convergence criterion. For example, when the algorithm is executed to an extent, it is difficult to obtain a smaller cost value after the algorithm is executed. In this case, it is considered that an algorithm convergence reaches the termination condition.

Optionally, the termination condition includes a time standard. For example, an execution time and iteration times of the algorithm are given in advance.

It should be understood that the termination condition of the MADRL algorithm is not limited. Optionally, the action decision may further include a computational power factor (that is, an example of second operating power). For example, an action decision for the terminal device i for the computational task X may be represented as $A_i=\{c_i, p_i\}$, where $p_i \in \{0, 1, \ldots, p_{max}\}$ represents a power factor when the terminal device i locally executes the task, 0 represents that the task is processed at sleep power, and $p_{max}$ represents that the task is processed at maximum power.

It should be understood that $p_i$ herein is operating power corresponding to the minimum cost value of the first computational task when the MADRL algorithm meets the termination condition.

It should be noted that $p_i$ herein represents a power level and does not represent a power value. For example, 0 indicates that the terminal device processes the task by using a power value at a lowest level. The power value corresponding to the lowest level herein is sleep power $P_{sleep}$. $P_{sleep}$ is a lower power value and does not indicate that the sleep power is 0. $p_{max}$ indicates that the task is processed by using a maximum power level, and actual power for processing the task is a maximum operating power value $p_{max}$ of the terminal device.

A frequency of processing the computational task corresponding to the power factor of the terminal device i is $$F_i = F_i^{sleep} + \frac{p_i}{p_{max}} * \left(F_i^{max} - F_i^{sleep}\right) \cdot F_i^{sleep}$$

19 and $$F_i^{max}$$

are constant values irrelevant to a decision option, and respectively represent frequency values at which the terminal device correspondingly processes the computational task at the sleep power and the maximum power.

The terminal device may provide a system Application Programming Interface (API) to adjust an energy mode of the device, and further determine a speed of processing the computational task, so that the power factor may represent a function of adjusting the computation frequency. For example, after the terminal device determines to execute the task in a local execution manner and uses $p_i$ as a power factor for processing the computational task, the terminal device first determines whether $p_i$ is equal to 0. If $p_i$ is not equal to 0 (that is, not the sleep power), it means that the terminal device needs to switch from the sleep power to power corresponding to $p_i$ to execute the computational task. Therefore, the system API is invoked to switch the computation frequency, while a time delay and an energy overhead may be generated. Computation of the time delay and the energy overhead caused by locally processing the task is described in detail in the following [benefit indicator setting], and details are not described herein.

In addition, the decision of the terminal device includes the following constraint conditions.

1. When determining computation offloading, the terminal device adjusts the power to the sleep power, that is, when $c_i=1$, $p_i=0$.
2. When the terminal device cannot access the edge node, the terminal device can only locally execute the task, that is, if $conn_i=0$ or $link_i=0$, $c_i=0$.

The terminal device i determines whether duration for processing the task in the action decision $A_i$ times out. When $T_i$ is less than $md_i$, the terminal device i determines processing rounds $round_i$ of the computational task X, and then goes to S607. When $T_i$ is greater than a task time limit $md_i$, it indicates that execution of the computational task X times out. In this case, the terminal device i directly ignores the task, generates a corresponding penalty value $mp_i$, and then goes to S601.

It should be noted that when $T_i$ is equal to $md_i$, the terminal device i performs 601 or 607 based on an actual status of the computational task. This is not limited.

S607: The terminal device i starts the new thread to process the computational task X in a decision-making manner, and then goes to S601.

The started new thread may obtain information about the decision $A_i$ and the computational task X and begin performing S608 to S612 asynchronously.

It should be noted that the execution process in which the terminal device i executes the computational task X is a procedure step executed in the new thread after the new thread is started in the decision-making process. Therefore, the decision-making process and the execution process do not block each other.

It should be understood that the terminal device i processes only one computational task in a same time slice, and a process of processing a single computational task may last for several time slices (that is, processing rounds).

Steps for the terminal device i to process the new thread of the computational task X are as follows:

S608: The terminal device i determines whether a decision-making action manner of a current decision $A_i$ is a computation offloading manner; and if yes, performs S609; otherwise, performs S611.

S609: The terminal device i sends, to the edge node j, information required for processing the computational task X.

It should be noted that, because a data stream transmitted in this process is large, a wireless transmission rate may affect a processing delay, and the wireless transmission rate is further affected by environment noise and bandwidth contention.

S610: The terminal device i receives a processing result of the task X returned by the edge node j, and then goes to S612.

S611: The terminal device i decides to process the computational task X by using the computational power factor $p_i$ in the decision $A_i=\{c_i, p_i\}$, and goes to S612 after completing the processing and obtaining the result.

S612: The terminal device i completes a processing process of the computational task X and returns a computation result, and then ends the thread.

Correspondingly, the computation offloading process of the edge node j is shown as follows:

S701: A decision-making process of the edge node j is in a waiting state, and the edge node j performs S702 or S703.

Optionally, the edge node j performs S702 at the beginning of each time slice.

Optionally, the edge node j first performs S703 and S704, and then performs S702.

S702: Determine currently available computing resources of the edge node j. S703: The edge node j starts to receive a task digest of a served terminal device.

Because one edge node usually serves one or more terminal devices, one edge node may receive one or more task digests sent by the served terminal device. Therefore, the process is maintained for a period of time. The terminal device served by the edge node j may be represented as $i \in D$ and $conn_i=j$.

S704: The edge node j stops receiving the task digest, determines task digest information of the served terminal device in a current time slice in this case, and then goes to S705.

The one or more task digests received by the edge node j include a task digest of the computational task X sent by the terminal device i, and the task digest includes state information $M_i$ of the computational task X.

Optionally, the task digest further includes current channel noise $w_i$ and a current channel gain $H_i$. For example, corresponding to S604, the edge node j receives a network packet $\cup_i=\{M_i, H_i, w_i\}$ sent by the terminal device i.

S705: The edge node j determines an allocation policy of currently available resources based on the received one or more task digests by using a MADRL method.

The allocation policy of available resources of the edge node j in each time slice may be expressed as: $A_{d+j}=\{a_{(j,1)}, a_{(j,2)}, \ldots, a_{(j,d)}\}$. Herein, a decision sequence number d+j of the edge node is used to distinguish from the decision sequence number i of the terminal device. $a_{(j,i)} \in \{0, 1, \ldots a_{(j,avail)}\}$ represents a quantity of computing resources allocated by the edge node j to the terminal device i, 0 indicates that no computing resource is allocated, and $a_{(j,avail)}$ indicates that all currently available resources are allocated. A task operation frequency corresponding to a quantity of allocated computing resources is $f_i=f_{(conn,i)}=a_{(conn,i)}*f_{unit}$.

$f_{unit}$ is a constant value irrelevant to a decision option with a unit of Hz and represents an operation frequency represented by a quantity of computing resources per unit.

A static state of the edge node j may be represented as $X_{d+j}=(g_{(j,1)}, g_{(j,2)}, \ldots, g_{(j,d)})$. $g_{(j,i)}$ is a quantity of computing resources that have been allocated by the edge node j to the terminal device i for use before this round of decision-making, that is, a quantity of resources that are being used by the edge node j.

A time slice t and an edge node j are given. The following constraint exists between the decision and the static state: a relationship $$a^t_{(j,avail)} = a_{(j,max)} - \sum_{i \in D \text{ and } conn_i=j} g^t_{(j,i)}$$

between the currently available resources and occupied resources.

In addition, a change procedure of $g_{(j,i)}$ in the task execution procedure is as follows: First, when the terminal device i sets a processing round $round_i$ in the computation offloading manner $c_i=1$, the terminal device i assigns a value $$g^{t+1}_{(j,i)} = a^t_{(j,i)}$$

(in addition, at the beginning of the time slice, there is $$g^1_{(j,i)} = 0,$$

that is, when the algorithm starts t=1, the terminal device is in an idle mode, and in this case, g=0). Then, at the end of the time slice t, there is $round_i=0$, and the terminal device i assigns a value $$g^{t+1}_{(j,i)} = 0$$

again.

After the edge node j receives a packet set of the served terminal devices, a state of the edge node j changes to $X'_{d+j}=X_{d+j} \cup \cup_{1j} \cup \cup_{2j} U \ldots \cup \cup_{nj}$ (that is, a fourth state of the first edge node), where $X_{d+j}$ (that is, a third state of the first edge node) is a state before the edge node j receives a plurality of computational task digests, and a message indicating that no packet is received is defined as $\cup_m=\{0, 0,0,0,0\}$ (indicating that a terminal device n does not send a packet to the edge node j at a current time, where a terminal device m is a terminal device served by the edge node j).

In addition, the decision for the edge node includes the following constraint conditions:

1. The edge node allocates resources only to a currently served terminal device, that is, there is not a case in which $i \in D$ and $j \in N$ enable $conn_i \neq j$ and $a_{(j,i)}>0$.
2. Resources allocated by the edge node in this round do not exceed the current available resources.

That is, for any $j \in N$, there is $$\sum_{i \in N} (a_{(j,i)} \times 1_{conn_i=j}) \leq a_{(j,avail)} \leq a_{(j,max)}.$$

3. After having allocated resources to a computational task, the edge node may not allocate additional resources. That is, for all $i \in D$ and $j \in N$, if g(j,i)>0, there is $a_{(j,i)}=0$. $g_{(j,i)}$ is a quantity of resources that have been allocated by the edge node j to the terminal device i before the beginning of the current time slice.

Based on the foregoing constraint conditions, the edge node j performs offline training learning based on a new state $X'_{d+j}$ and an MADRL algorithm until an algorithm termination condition is met, to obtain a final action decision $A_{d+j}=\{a_{(j,1)}, a_{(j,2)}, \ldots, a_{(j,d)}\}$ (that is, an example of a second offloading decision), and sends the action decision to the served terminal device in a broadcast manner by using a wireless access point. For example, a message content form may be $\cup_{d+j}=\{a_{(j,1)}, a_{(j,2)}, \ldots, a_{(j,d)}\}$.

S706: The edge node j broadcasts a resource allocation policy of the edge node j by using a connected wireless access point, and then goes to S707.

S707: The edge node j starts a plurality of new threads to execute a task processing process, and then goes to S701. A quantity of the started threads should not be less than a quantity of terminal devices to which resources are allocated.

It should be noted that the execution process of the edge node j for the computational task is a procedure step executed in the new thread after the new thread is started in the decision-making process. Therefore, the decision-making process and the execution process do not block each other. In addition, in this step, the edge node j may also establish the following asynchronous process in a thread pool method. The started new thread may receive a computational task from a served terminal device and start performing S708 to S711 in an asynchronous manner according to the decided resource allocation policy.

Steps for the edge node j to process each new thread of the computational task are as follows:

S708: The edge node j receives computational task information of the served terminal device. It should be understood that the terminal device, in terminal devices served by the edge node j, may offload the computational task to the edge node j for computing.

For example, if the action decision of the terminal device i in S608 determines to offload the computational task X to the edge node j for computing, the terminal device i sends information about the computational task X to the edge node j. Correspondingly, the edge node j receives the information about the computational task X sent by the terminal device i.

S709: The edge node j processes the received computational task according to the resource allocation policy in S605.

Optionally, in an implementation, an operating time of the processor may be divided into small parts in a resource time division multiplexing manner, and the small parts are allocated to each computing thread according to a proportion of a total resource amount occupied by the resource allocation.

S710: The edge node j sends, to a corresponding terminal device, a computation result obtained after processing of the new thread.

S711: After completing the computational task procedure, the edge node j ends the corresponding thread.

The terminal device i and the edge node j each complete the process of performing computation offloading by using the MADRL algorithm. The following describes in detail the decision benefit indicators of the MADRL algorithm in S606 and S705.

In a process of using the MADRL algorithm, the terminal device and the edge node each need to compute, based on respective benefit indicators, a cost value of executing the task, and determine a respective action policy.

The benefit indicator of the terminal device is classified into two cases: local execution and computation offloading.

Case 1:

In S606, the terminal device i selects local execution ($c_i$=0) for the computational task X, that is, $A_i$={0, $p_i$}, where $M_i$={$mt_i$, $mc_i$, $md_i$, $mp_i$}.

1. A time for locally executing the task X (that is, the task processing time in S603) may be computed according to the following formula $$T_i = \frac{1}{F_i}\left(mc_i + mc_i^{set} * 1_{F_i \neq F_i^{sleep}}\right)$$

(that is, an example of a second delay overhead). $F_i$ represents a frequency that is determined based on the power factor and at which the terminal device i processes the computational task, and $$1_{F_i \neq F_i^{sleep}}$$

is an indicator function. When an inequality on a lower right of the indicator function is true, a function value is 1; otherwise, a function value is 0.

$$mc_i^{set}$$

represents a quantity of clock cycles required for adjusting the terminal device i from the sleep power to $p_i$, and is a fixed value for a terminal device i.

2. Energy consumed for locally executing the task X may be computed according to the following formula $$E_i = \left(\varepsilon * F_i^2\right) * \left(mc_i + mc_i^{set} * 1_{F_i \neq F_i^{sleep}}\right)$$

(that is, an example of a second energy consumption overhead).

$$\left(\varepsilon * F_i^2\right)$$

represents a coefficient of energy consumed in each computation period, and optionally, $\varepsilon = 10^{-11}$.

Case 2:

In S606, the terminal device i selects computation offloading ($c_i$=1) for the computational task X, that is, $A_i$={1, 0}.

1. A time for executing the computation offloading task X may be computed according to the following formula $$T_i = \frac{mt_i}{R_i(c_{all})} + \frac{mc_i}{f_i}$$

(that is, an example of a first delay overhead), that is, a sum of a time $$\frac{mt_i}{R_i(c_{all})}$$

for transmitting a computational task data stream and a processing time $$\frac{mc_i}{f_i}$$

of the edge node. A wireless transmission rate $R_i(c_{all})$ for transmitting the computational task data stream may be computed by using the following formula $$R_i(c_{all}) = W_{link_i}\,\log_2\left(1 + P_iH_i\Bigg/\left(w_i + \sum_{k \in N\backslash\{i\}}\left(P_kH_k * 1_{c_k=1} * 1_{link_k=link_i}\right)\right)\right).$$

$c_{all}$={$c_1$, $c_2$, ..., $c_d$} represents a set of decisions on whether all terminal devices perform computation offloading. $W_{link_i}$ represents wireless channel bandwidth (a fixed constant value) whose sequence number is $link_i$, $P_i$ represents transmit power of the terminal device i (it is assumed that the transmit power is fixed), and $H_i$ represents a channel gain from the terminal device i to the wireless access point. $w_i$ indicates background interference power, and the background interference power may include background noise and communication interference of another wireless device that does not participate in the computation offloading decision on the channel $$\sum_{k \in N\backslash\{i\}}\left(P_kH_k * 1_{c_k=1} * 1_{link_k=link_i}\right)$$

indicates an interference sum of another device that makes a computation offloading decision in the current time slice and use the same channel.

2. Energy consumed for executing the task X through the computation offloading may be expressed as $$E_i = P_i^* \frac{mt_i}{R_i(c_{all})} + E^{tail}$$

(that is, an example of a first energy consumption overhead), that is, a sum of data sending energy consumption and data receiving energy consumption. The receiving energy consumption includes a part of tail energy consumption generated in a waiting process after receiving, and $E^{tail}$ is energy consumed for receiving the task. Considering that a time for receiving the task is short, generally, the receiving energy consumption may be approximately a constant value.

Based on the foregoing two benefit indicators, a cost (that is, a negative value of the benefit) of executing the computational task by the terminal device weighs a task execution time and corresponding energy consumption, and may be expressed as:

$$C_i(A, X) = \begin{cases} \alpha_i * T_i + \beta_i * E_i & c_i = 1 \text{ and } M_i \neq M_0 \text{ and } T_i \leq md_i \text{ and } round_i = 0 \\ T_i + \beta_i * E_i & c_i = 0 \text{ and } M_i \neq M_0 \text{ and } T_i \leq md_i \text{ and } round_i = 0 \\ mp_i & \text{otherwise} \end{cases}$$

A cost formula $C_i(A, X)$ (that is, an example of a first cost function) of the terminal device i represents a cost value corresponding to resource consumption generated when the terminal device i processes, based on a state of a current task and a decision set A of all decision entities (that is, all terminal devices and edge nodes), a decision procedure. $a_i \in (0,1]$ (that is, an example of a first parameter) is a difference factor and is used to weigh a difference between a task processed by the terminal device i and a task processed by a corresponding edge node. When the terminal device and the corresponding edge node each process the computational task by using a same method, there is $a_i = 1$. Otherwise, if the corresponding edge node processes the computational task by using a technology with better performance, a processing cost of the corresponding edge node needs to be weighed by adjusting the value. $\beta_i \geq 0$ (that is, an example of a second parameter) is defined as an energy trade-off factor and is used to indicate a value of sensitivity of the terminal device i to the energy consumption. When a baseline value is used, $\beta_i = 1$.

It should be understood that the decision $A_i$ herein is not a final action decision of the terminal device i, and the action decision is a decision in an iterative learning process of the terminal device i by using the MADRL algorithm. The final decision of the terminal device i is an action decision determined by computing the minimum cost value of the computational task X based on the benefit indicator when the MADRL algorithm meets the termination condition.

The Benefit Indicator of the Edge Node:

Evaluation of the benefit indicator of the edge node weighs an average cost and fairness of the terminal devices served by the edge node. With reference to the foregoing indicator, in S705, the benefit indicator of the edge node j may be represented as $C_{d+j} = ct_j/cf_j$ (that is, an example of a second cost function), and the benefit indicator of the edge node j is used to compute cost values of the edge node j in different resource allocation policies. $ct_j$ (that is, an example of an average cost function) represents an average cost of the terminal devices served by the edge node j in the current time slice, that is, $$ct_j = \begin{cases} \dfrac{\sum_{i \in D_{(j,serv)}} C_i(A, X)}{|D_{(j,serv)}|} & \text{if } |D_{(j,serv)}| > 0, \text{ where} \\ 0 & \text{otherwise} \end{cases}$$

$$D_{(j,serv)} = \{i | i \in D \text{ and } conn_i = j\}.$$

$cf_j$ (that is, an example of a fair cost function) is a fairness factor that is set based on a quantity of terminal devices that are currently using computing resources of the edge node j, and may be expressed as:

$$cf_j = K\left(\sum_{i \in D: conn_i = j} 1_{g'_{(j,i)} > 0}\right)$$

$g'_{(j,i)}$ is a quantity of resources that have been allocated by the edge node j to the terminal device i at the end of the current time slice. $K(x)$ is a nonnegative monotonically increasing function. An empirical function may be based on an actual situation. This is not limited.

Optionally, one type of $K(x)$ function may be set to $K(0)=0.2$, $K(1)=1$, $K(2)=1.6$, $K(3)=1.8$, $K(4)=2.2$, $K(5)=2.5$, $K(6)=2.7$, $K(7)=2.8$, where $K(x)=3$ ($x \geq 8$, and x is an integer).

Optionally, another type of $K(x)$ function may be set to $K(x)=\log 2 (x+2)$, where $x \geq 0$, and x is an integer.

Optionally, still another type of $K(x)$ function may be set to $K(x)=x+1$, where $x \geq 0$, and x is an integer.

It should be understood that the final decision of the edge node j is an action decision determined by computing the minimum cost value of the edge node j based on the benefit indicator of the edge node when the MADRL algorithm meets the termination condition.

The interaction process and the exchange information between the terminal device and the edge node in the computation offloading process may be described in detail. The terminal device and the edge node each can have a wider capability of sensing the environment in actual decision-making, which can effectively improve decision-making benefits of the terminal device and the edge node. In addition, an information exchange process is simple and easy to implement, and an overhead corresponding to the process is small.

Both the offloading decision and the resource allocation decision of the computation offloading party (that is, the terminal device) and the resource provider (that is, the edge node) are considered. The proposed benefit indicator weighs a plurality of factors, and a corresponding fairness factor is defined based on an actual situation, so that the benefit indicator reflects a more comprehensive actual environment. In addition, thanks to advantages of the MADRL algorithm, there are few necessary approximations, and stability of the algorithm during problem resolving can be ensured. The necessary approximation here refers to an approximation hypothesis or condition that has to be introduced during the problem resolving, and the MADRL has strong adaptability to the problem when being resolved.

In addition, a power control factor is introduced into the benefit indicator of the computational task locally processed by the terminal device, to particularly analyze and resolve a problem of a cost loss during power switching. This helps describe decision content in the computation offloading more precisely, thereby effectively improving user experience and reducing a model error. In another aspect, for a decision item of the edge node, average experience of the served terminal devices is also ensured, and fairness of resource utilization of network terminals is also improved. That is, an excessively small quantity of served users is avoided while efficient resource allocation is ensured.

The following uses a multi-agent depth deterministic policy gradient (MADDPG) algorithm as an example to describe the computation offloading process. As a typical MADRL algorithm, the MADDPG is an improved algorithm of the DDPG for adapting to a multi-agent environment, and each agent independently runs one DDPG. The DDPG algorithm is an upgraded version of the Actor-Critic algorithm. The improvement of the MADDPG is that a Critic part of each agent can obtain action information of other agents, so that action policies of the other agents can be sensed during training.

The MADDPG-based computation offloading method includes an offline training process and an online derivation process, where the offline training process includes a data collection and training process. The offline training process and the online derivation process of the MADDPG are described with reference to FIG. 7 to FIG. 9.

Figure 7:
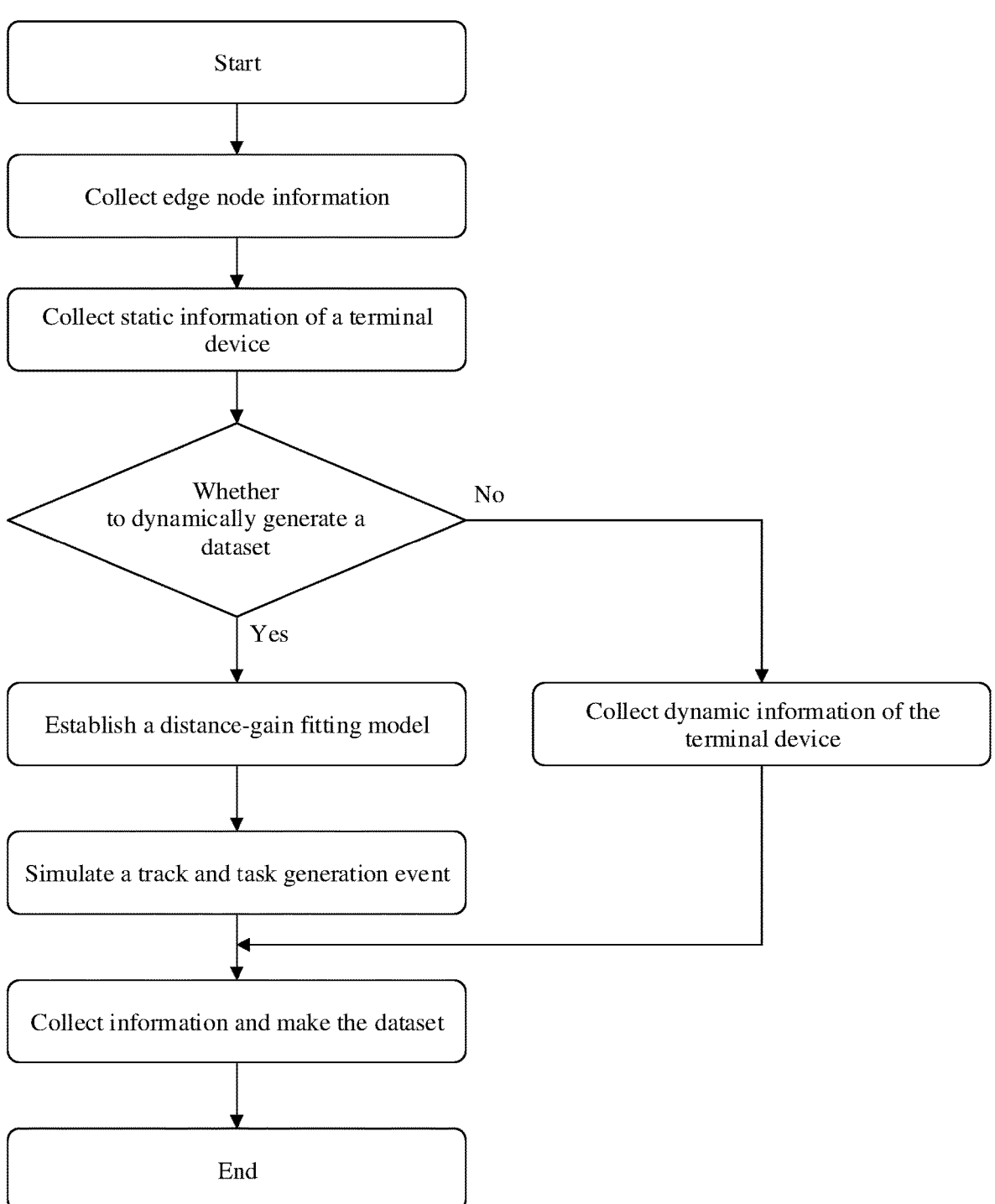
FIG. 7 is a schematic flowchart of MADDPG-based data collection.

FIG. 7 is a schematic flowchart of MADDPG-based data collection. Steps of the training data collection process may be as follows.

(1) Collect edge node information: Collect a computation capability of the edge node and a list of terminal devices served by the edge node.

(2) Collect static information of the terminal device: Collect static information related to the device from the terminal device, including a computation capability, transmission power, an association status, a task type, and the like of the terminal device.

(3) Determine whether to dynamically generate a dataset: If yes, go to (4), and if no, goes to (6).

(4) Establish a distance-gain fitting model: The distance-gain fitting model is established based on dynamic information such as a transmission rate and a physical distance, to obtain a channel gain H of the terminal device in a current state, and randomly generate background noise w.

(5) Simulate a track and task generation event: Simulate a moving track and task generation mechanism of the terminal based on specified parameters. It is assumed that the terminal generates a moving track in a random waypoint pattern during moving, and it is assumed that the computational task occurs in a random event manner and complies with the Bernoulli distribution. Then, go to (7).

(6) Collect dynamic information of the terminal: Collect dynamic information, from the terminal, required for decisions such as channel interference, a transmission rate, and a task generation event. After collecting is completed, a next step is performed.

(7) Collecting information and making the dataset. Then, end.

Figure 8:
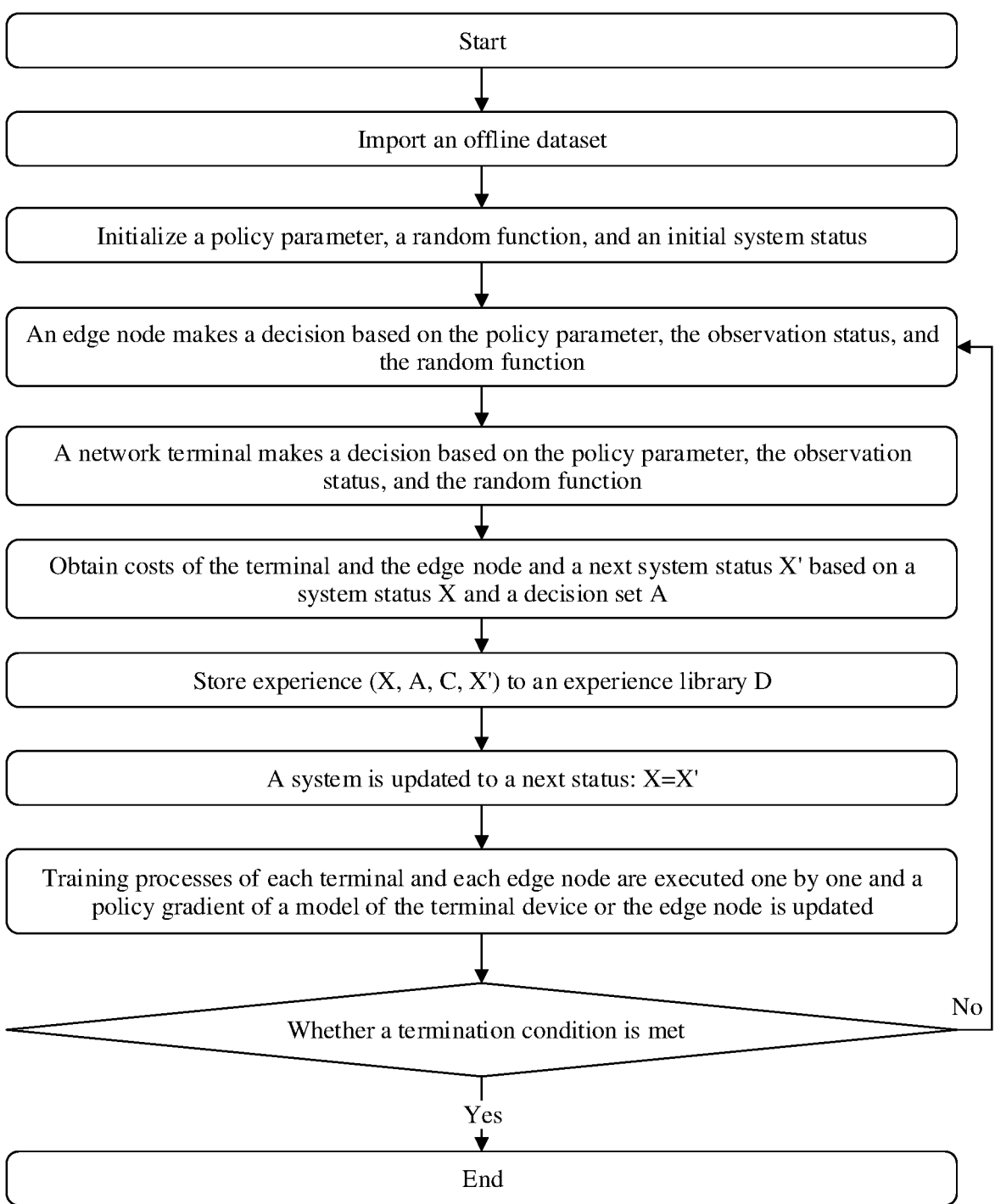
FIG. 8 is a schematic flowchart of MADDPG-based parameter model training.

FIG. 8 is a schematic flowchart of MADDPG-based parameter model training.

Only training processes of parameter models of the terminal device and the edge node are briefly described herein. For the process of performing offline training by using the trained parameter model, refer to descriptions in FIG. 6A and FIG. 6B. Details are not described herein again.

The Process of Offline Training the Parameter Model is Described as Follows:

(1) Import an offline dataset: Import a dataset created during collection to the training model.

(2) Initialize a policy parameter, a random function, and a system initial status X of each terminal device and each edge node.

For the terminal device, the system initial status includes: an initial task status, a network link status, an edge node connection status, and a network noise status. In this case, a processing round is 0 (that is, the terminal device is in an idle mode in this case).

For the edge node, the system initial status is (0, 0, 0, . . . , 0), and it indicates that no computing resource is initially allocated to a served terminal device.

(3) Execute a computation offloading process: The edge node first makes a decision based on the policy parameter, the observation status, and the random function.

(4) The terminal device makes a corresponding decision based on the policy parameter, the observation status, and the random function.

(5) Based on the system status X and a decision set $A_i$, an action cost C of executing the task in the round of time slice by the terminal device and the edge node is obtained in the training process, and a next system status X' is generated.

(6) The system status X, the agent action set $A_i$, the action cost C, and the next system status X' are collected to form experience (X, $A_i$, C, X'), and the experience is kept in an experience library D.

(7) In a device (the terminal device or the edge node) of the training process, training processes of each terminal device and each edge node are executed one by one, and a policy gradient of a corresponding model is updated.

(8) Finally, it is determined whether the training process meets a termination condition. If yes, the process ends and a model parameter is saved; otherwise, the training process continues.

Figure 9:
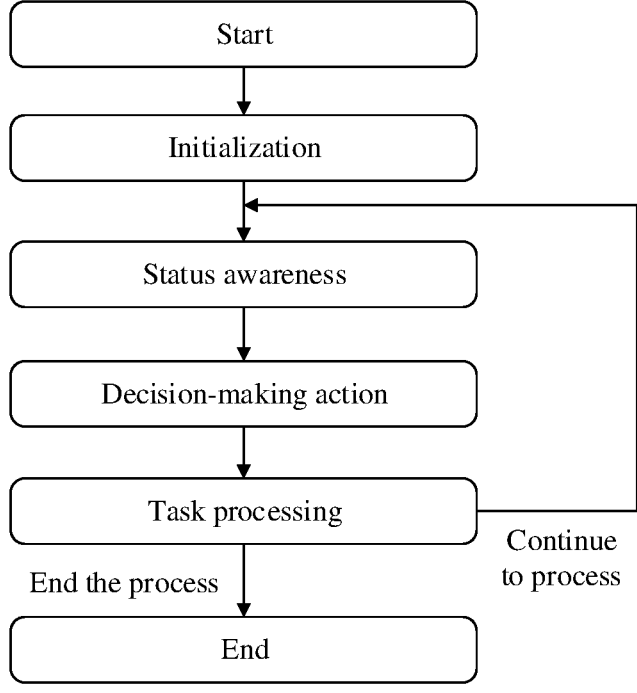
FIG. 9 is a schematic flowchart of a MADDPG-based computation offloading method.

FIG. 9 is a schematic flowchart of a MADDPG-based computation offloading method. The computation offloading process described in FIG. 9 is basically the same as that described in FIG. 6A and FIG. 6B, and only brief description is provided herein.

(1) Initialization: The edge node performs an initialization process based on obtained parameter information. The terminal device uploads static information of the terminal device, such as a computational task type and a computation capability. The edge node delivers a similarly configured model parameter of the terminal device based on the foregoing information, so that the terminal initializes the model parameter and executes a time slice synchronization process.

(2) Status awareness: When a new task is generated on the terminal, the terminal sends a task digest to a corresponding edge node at the beginning of the time slice. The edge node collects and executes the MADRL derivation process based on the current state and the digest information of the terminal device, decides a computing resource allocation policy, and broadcasts the policy to the served terminal devices.

(3) Decision-making action: The terminal device performs the MADRL derivation process based on the broadcast information of the edge node and the state information of the terminal device and decides a corresponding action only by using the Actor parameter in the MADDPG algorithm.

(4) Task processing: The terminal device and the edge node complete the decision-making process and perform a corresponding action.

(5) End: When the terminal device no longer needs the computation offloading, the terminal device exists the decision-making process. When all terminal devices served by the edge node no longer need the computation offloading, the edge node exits the service process.

The foregoing describes method embodiments, and the following describes apparatus embodiments. It should be understood that descriptions of apparatus embodiments correspond to the descriptions of the method embodiments. Therefore, for content that is not described in detail, refer to the foregoing method embodiments. For brevity, details are not described herein again.

Figure 10:
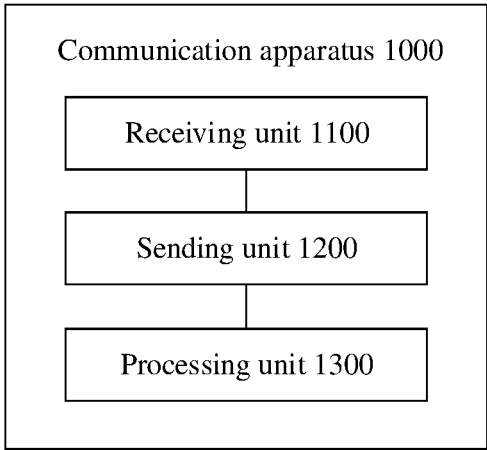
FIG. 10 is a schematic block diagram of a communication apparatus.

FIG. 10 is a schematic block diagram of a communication apparatus 1000. As shown in FIG. 10, the communication apparatus 1000 includes a receiving unit 1100, a sending unit 1200, and a processing unit 1300.

The sending unit 1200 is configured to send a first state of a first computational task to a first edge node, where the first edge node is an edge node from which the apparatus obtains computing resources, and the first state includes at least one of a length of a data stream for transmitting the first computational task, a quantity of clocks that need to be consumed for computing the first computational task, and a penalty value of the first computational task.

The receiving unit 1100 is configured to receive a second offloading decision sent by the first edge node, where the second offloading decision is determined based on the first state, the second offloading decision includes computing resource allocation information of one or more second terminal devices, the second terminal device is a terminal device that obtains computing resources from the first edge node, and the apparatus is one of the one or more second terminal devices.

The processing unit 1300 is configured to determine a first offloading decision of the first computational task according to the second offloading decision, where the first offloading decision indicates whether the processing unit 1300 offloads the first computational task to the first edge node for computing.

Optionally, the receiving unit 1100 and the sending unit 1200 may also be integrated into a transceiver unit and may have both a receiving function and a sending function. This is not limited herein.

Optionally, in an embodiment, when the first offloading decision indicates the communication apparatus to offload the first computational task to the first edge node for computing, the sending unit 1200 is further configured to:

send the first computational task to the first edge node; and the receiving unit 1100 is further configured to receive a computation result that is of the first computational task and that is sent by the first edge node; or when the first offloading decision indicates the communication apparatus not to offload the first computational task, the processing unit 1300 is further configured to locally determine a computation result of the first computational task.

Optionally, in an embodiment, the processing unit 1300 may be configured to update a parameter in the first state of the first computational task according to the second offloading decision, to obtain a second state of the first computational task; compute a cost value of the first computational task based on the second state, where the cost value of the first computational task includes a local overhead and an offloading overhead of the first computational task; and determine the first offloading decision of the first computational task based on the cost value of the first computational task.

Optionally, in an embodiment, the processing unit 1300 may be configured to determine the cost value of the first computational task based on the second state by using a first cost function in a multi-agent deep reinforcement learning MADRL algorithm, where the first cost function includes an offload overhead function and a local computation overhead function, the offload overhead function is used to determine the offloading overhead of the first computational task, and the local computation overhead function is used to determine the local overhead of the first computational task, and iteratively update a state of the first computational task and the cost value of the first computational task of the apparatus based on the MADRL algorithm; and when the MADRL algorithm meets a termination condition, the processing unit 1300 is further configured to determine the first offloading decision of the first computational task based on a minimum cost value of the first computational task.

Optionally, in an embodiment, the offloading overhead of the first computational task includes a first energy consumption overhead and a first delay overhead, the first energy consumption overhead includes energy consumed by the apparatus to offload the first computational task to the first edge node, and the first delay overhead includes a delay of offloading, by the apparatus, the first computational task to the first edge node and a delay of determining, by the first edge node, the computation result of the first computational task.

Optionally, in an embodiment, the local overhead of the first computational task includes a second energy consumption overhead and a second delay overhead, where the second energy consumption overhead includes energy consumed by the apparatus for locally computing the first computational task and energy consumed by the apparatus for switching from sleep power $P_{sleep}$ to first operating power $P_1$; the second delay overhead includes a delay of locally computing the first computational task by the apparatus and a delay of switching the apparatus from the sleep power to the first operating power $P_1$; and the first operating power $P_1$ is an operating power of a local computational task of the apparatus.

Optionally, in an embodiment, the first offloading decision further includes second operating power, and the second operating power is operating power corresponding to the minimum cost value of the first computational task when the MADRL algorithm meets the termination condition.

Optionally, in an embodiment, when the first offloading decision indicates the apparatus to offload the first computational task to the first edge node for computing, the processing unit 1300 is further configured to operate at the sleep power.

Optionally, in an embodiment, the processing unit 1300 is further configured to dynamically adjust the first delay overhead by using a first parameter, where the first parameter indicates a difference between processing a computational task by the processing unit 1300 and processing a computational task by the first edge node.

Optionally, in an embodiment, the processing unit 1300 is further configured to dynamically adjust the first energy consumption overhead and the second energy consumption overhead by using a second parameter, and the second parameter indicates sensitivity of the processing unit 1300 to an energy consumption overhead.

In an implementation, the communication apparatus 1000 may be the first terminal device in the method embodiments. In this implementation, the receiving unit 1100 may be a receiver, and the sending unit 1200 may be a transmitter. Alternatively, the receiver and the transmitter may be integrated into a transceiver.

In another implementation, the communication apparatus 1000 may be a chip or an integrated circuit in the first terminal device. In this implementation, the receiving unit 1100 and the sending unit 1200 may be a communication interface or an interface circuit. For example, the receiving unit 1100 is an input interface or an input circuit, and the sending unit 1200 is an output interface or an output circuit.

The processing unit 1300 may be a processing apparatus. A function of the processing apparatus may be implemented by hardware or may be implemented by hardware executing corresponding software. For example, the processing apparatus may include at least one processor and at least one memory. The at least one memory is configured to store a computer program. The at least one processor reads and executes the computer program stored in the at least one memory, so that the communication apparatus 1000 performs operations and/or processing performed by the first terminal device in the method embodiments.

Optionally, the processing apparatus may include only the processor, and the memory configured to store the computer program is located outside the processing apparatus. The processor is connected to the memory through a circuit/wire to read and execute the computer program stored in the memory. Optionally, in some examples, the processing apparatus may alternatively be a chip or an integrated circuit.

Figure 11:
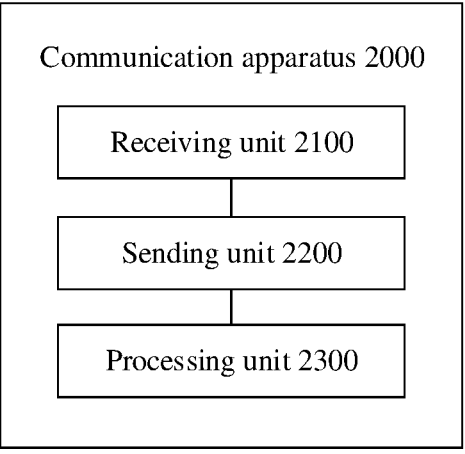
FIG. 11 is a schematic block diagram of a communication apparatus.

FIG. 11 is a schematic block diagram of a communication apparatus 2000. As shown in FIG. 11, the communication apparatus 2000 includes a receiving unit 2100, a sending unit 2200, and a processing unit 2300.

The receiving unit 2100 is configured to receive states of one or more tasks, where the states of the one or more tasks may include a first state of a first computational task sent by a first terminal device, the apparatus is an edge node that provides computing resources for one or more second terminal devices, and the first terminal device is one of the one or more second terminal devices.

The processing unit 2300 is configured to determine a second offloading decision based on the states of the one or more tasks, where the second offloading decision includes computing resource allocation information of the processing unit 2300 for the one or more second terminal devices.

The sending unit 2200 is configured to broadcast the second offloading decision to the one or more second terminal devices.

Optionally, the receiving unit 2100 and the sending unit 2200 may also be integrated into a transceiver unit and may have both a receiving function and a sending function. This is not limited herein.

Optionally, in an embodiment, the receiving unit 2100 is further configured to receive the first computational task sent by the first terminal device; the processing unit 2300 is further configured to determine a computation result of the first computational task; and the sending unit 2200 is further configured to send the computation result of the first computational task to the first terminal device.

Optionally, in an embodiment, the processing unit 2300 may be configured to update a third state of the first edge node based on the states of the one or more tasks to obtain a fourth state of the first edge node, where the third state is a state before the first edge node receives the states of the one or more tasks; the processing unit 2300 is further configured to determine a cost value of the apparatus based on the fourth state, where the cost value is an overhead for allocating the computing resources by the processing unit 2300 to the one or more computational tasks; and the processing unit 2300 determines the second offloading decision based on the cost value.

Optionally, in an embodiment, the processing unit 2300 may be configured to determine the cost value based on the fourth state by using a first cost function and a second cost function in a MADRL algorithm, where the first cost function includes an offload overhead function and a local computation overhead function, the offload overhead function is used to determine offloading overheads of the one or more tasks, and the local computation overhead function is used to compute local overheads of the one or more tasks; the second cost function includes an average cost function and a fair cost function, the average cost function is used to determine an average overhead of the one or more tasks based on the offloading overheads and the local overheads of the one or more tasks, and the fair cost function is used to determine a fair cost of the apparatus based on a quantity of second terminal devices that use computing resources of the apparatus; and the processing unit 2300 may be configured to determine the cost value of the apparatus based on the average overhead of the one or more tasks and the fair cost.

Optionally, in an embodiment, the processing unit 2300 may be configured to iteratively update a state of the first edge node and the cost value of the first edge node based on the MADRL algorithm; and when the MADRL algorithm meets a termination condition, the processing unit 2300 is further configured to determine the second offloading decision based on a minimum cost of the first edge node.

In an implementation, the communication apparatus 2000 may be the first edge node in the method embodiments. In this implementation, the receiving unit 2100 may be a receiver, and the sending unit 2200 may be a transmitter. Alternatively, the receiver and the transmitter may be integrated into a transceiver.

In another implementation, the communication apparatus 2000 may be a chip or an integrated circuit in the first edge node. In this implementation, the receiving unit 2100 and the sending unit 2200 may be a communication interface or an interface circuit. For example, the receiving unit 2100 is an input interface or an input circuit, and the sending unit 2200 is an output interface or an output circuit.

The processing unit 1300 may be a processing apparatus. A function of the processing apparatus may be implemented by hardware or may be implemented by hardware executing corresponding software. For example, the processing apparatus may include at least one processor and at least one memory. The at least one memory is configured to store a computer program. The at least one processor reads and executes the computer program stored in the at least one memory, so that the communication apparatus 2000 performs operations and/or processing performed by the first edge node in the method embodiments.

Optionally, the processing apparatus may include only the processor, and the memory configured to store the computer program is located outside the processing apparatus. The processor is connected to the memory through a circuit/wire to read and execute the computer program stored in the memory. Optionally, in some examples, the processing apparatus may alternatively be a chip or an integrated circuit.

Figure 12:
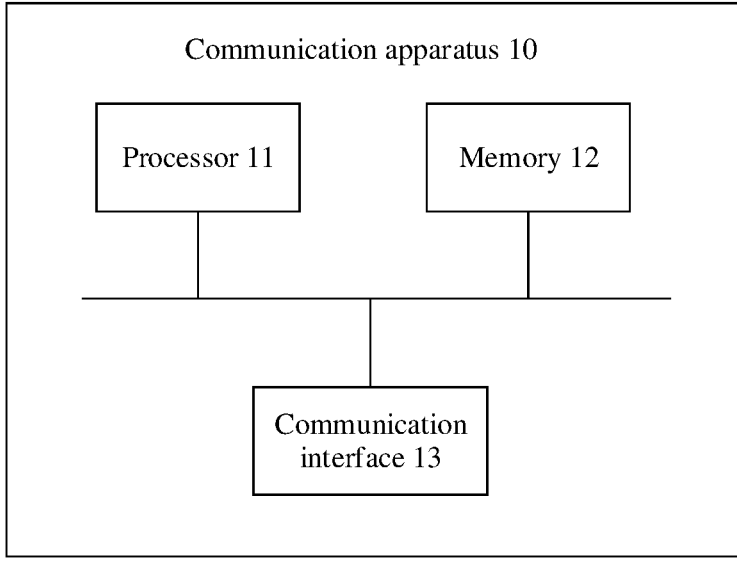
FIG. 12 is a schematic block diagram of a communication apparatus.

FIG. 12 is a schematic block diagram of a communication apparatus 10. As shown in FIG. 12, the communication apparatus 10 includes one or more processors 11, one or more memories 12, and one or more communication interfaces 13. The processor 11 is configured to control the communication interface 13 to receive and send signals. The memory 12 is configured to store a computer program. The processor 11 is configured to invoke the computer program from the memory 12 and run the computer program, so that procedures and/or operations performed by the terminal device in the method embodiments are performed.

For example, the processor 11 may have a function of the processing unit 1300 shown in FIG. 10, and the communication interface 13 may have a function of the sending unit 1100 and/or the receiving unit 1200 shown in FIG. 10. The processor 11 may be configured to perform processing or operations internally performed by the first terminal device in FIG. 5 and FIG. 6A and FIG. 6B, and the communication interface 13 is configured to perform sending actions and/or receiving actions performed by the first terminal device in FIG. 5 and FIG. 6A and FIG. 6B.

In an implementation, the communication apparatus 10 may be the first terminal device in the method embodiments. In this implementation, the communication interface 13 may be a transceiver. The transceiver may include a receiver and a transmitter. Optionally, the processor 11 may be a baseband apparatus, and the communication interface 13 may be a radio frequency apparatus. In another implementation, the communication apparatus 10 may be installed in a chip or an integrated circuit in the first terminal device. In this implementation, the communication interface 13 may be an interface circuit or an input/output interface.

Figure 13:
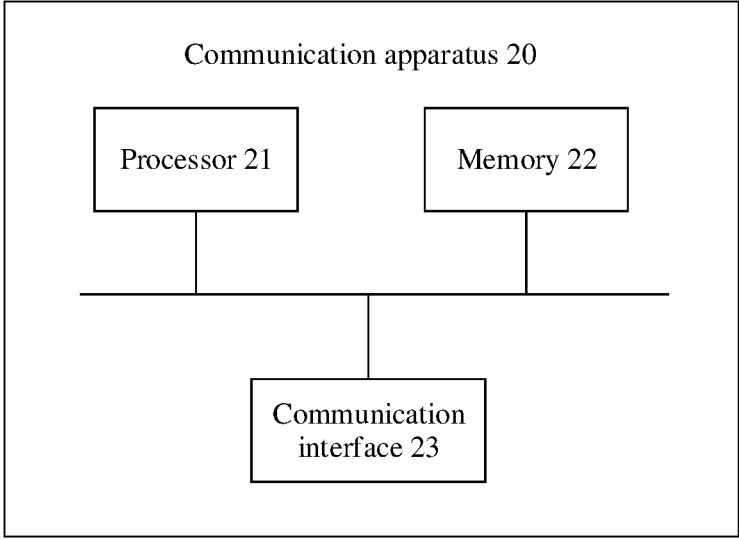
FIG. 13 is a schematic block diagram of a communication apparatus 20.

FIG. 13 is a schematic block diagram of a communication apparatus 20. As shown in FIG. 13, the communication apparatus 20 includes one or more processors 21, one or more memories 22, and one or more communication interfaces 23. The processor 21 is configured to control the communication interface 23 to receive and send signals. The memory 22 is configured to store a computer program. The processor 21 is configured to invoke the computer program from the memory 22 and run the computer program, so that procedures and/or operations performed by the network device in the method embodiments are performed.

For example, the processor 21 may have a function of the processing unit 2300 shown in FIG. 11, and the communication interface 23 may have a function of the sending unit 2200 and/or the receiving unit 2100 shown in FIG. 11. The processor 21 may be configured to perform processing or operations internally performed by the first edge node in FIG. 5 and FIG. 6A and FIG. 6B, and the communication interface 33 is configured to perform sending actions and/or receiving actions performed by the first edge node in FIG. 5 and FIG. 6A and FIG. 6B.

In an implementation, the communication apparatus 20 may be the first edge node in the method embodiments. In this implementation, the communication interface 23 may be a transceiver. The transceiver may include a receiver and a transmitter. In another implementation, the communication apparatus 20 may be installed in a chip or an integrated circuit in the first edge node. In this implementation, the communication interface 23 may be an interface circuit or an input/output interface.

Optionally, the memory and the processor in the foregoing apparatus embodiments may be physically independent units, or the memory may be integrated into the processor. This is not limited in the embodiments.

In addition, the embodiments may further provide a non-transitory computer-readable storage medium. The non-transitory computer-readable storage medium stores computer instructions. When the computer instructions are run on a computer, operations and/or procedures performed by the first terminal device in the method embodiments are performed.

In addition, the embodiments may further provide a non-transitory computer-readable storage medium. The non-transitory computer-readable storage medium stores computer instructions. When the computer instructions are run on a computer, operations and/or procedures performed by the first edge node in the method embodiments are performed.

In addition, the embodiments may further provide a computer program product. The computer program product includes computer program code or instructions. When the computer program code or the instructions are run on a computer, operations and/or procedures performed by the first terminal device in the method embodiments are performed.

The embodiments may further provide a computer program product. The computer program product includes computer program code or instructions. When the computer program code or the instructions are run on a computer, operations and/or procedures performed by the first edge node in the method embodiments are performed.

In addition, the embodiments may further provide a chip. The chip includes a processor. A memory configured to store a computer program is disposed independently of a chip, and the processor is configured to execute the computer program stored in the memory, so that an operation and/or processing performed by the first terminal device in any method embodiment is performed. Further, the chip may include a communication interface. The communication interface may be an input/output interface, an interface circuit, or the like. Further, the chip may include the memory.

The embodiments may further provide a chip. The chip includes a processor. A memory configured to store a computer program is disposed independently of a chip, and the processor is configured to execute the computer program stored in the memory, so that an operation and/or processing performed by the first edge node in any method embodiment is performed.

Further, the chip may include a communication interface. The communication interface may be an input/output interface, an interface circuit, or the like. Further, the chip may include the memory.

In addition, the embodiments may further provide a communication apparatus (for example, may be a chip), including a processor and a communication interface. The communication interface is configured to receive a signal and transmit the signal to the processor, and the processor processes the signal, so that the operation and/or processing performed by the first terminal device in any method embodiment are/is performed.

The embodiments may further provide a communication apparatus (for example, may be a chip), including a processor and a communication interface. The communication interface is configured to receive a signal and transmit the signal to the processor, and the processor processes the signal, so that the operation and/or processing performed by the first edge node in any method embodiment are/is performed.

In addition, the embodiments may further provide a communication apparatus, including at least one processor, the at least one processor is coupled to at least one memory, and the at least one processor is configured to execute a computer program or instructions stored in the at least one memory, so that the operation and/or processing performed by the first terminal device in any method embodiment are/is performed.

The embodiments may further provide a communication apparatus, including at least one processor, the at least one processor is coupled to at least one memory, and the at least one processor is configured to execute a computer program or instructions stored in the at least one memory, so that the operation and/or processing performed by the first edge node in any method embodiment are/is performed.

In addition, the embodiments may further provide a first terminal device, including a processor, a memory, and a transceiver. The memory is configured to store a computer program. The processor is configured to invoke and run the computer program stored in the memory and control the transceiver to receive and send a signal, so that the first terminal device performs an operation and/or processing performed by the first terminal device in any method embodiment.

The embodiments may further provide a first edge node, including a processor, a memory, and a transceiver. The memory is configured to store a computer program. The processor is configured to invoke and run the computer program stored in the memory and control the transceiver to receive and send a signal, so that the first terminal device performs an operation and/or processing performed by the first edge node in any method embodiment.

In addition, the embodiments may further provide a wireless communication system, including the first terminal device and the first edge node in the embodiments.

The processor in this embodiment may be an integrated circuit chip and may have a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like. The steps of the methods in the embodiments may be directly presented as being performed and completed by a hardware encoding processor or performed and completed by a combination of hardware and a software module in an encoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in this embodiment may be a volatile memory, a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples, but not limitative description, RAMs in many forms are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memory of the systems and methods described in the embodiments includes, but is not limited to, these and any memory of another proper type.

A person of ordinary skill in the art may be aware that, in combination with the examples described in embodiments, units and algorithm steps may be implemented by electronic hardware or a combination of computer software and electronic hardware. Whether the functions are performed by hardware or software may depend on particular applications. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments, it should be understood that the system, apparatus, and method may be implemented in other manners. For example, the described apparatus embodiment is merely an example. For example, division into the units is merely a logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments may be integrated into one processing unit, each of the units may exist alone physically, or two or more units are integrated into one unit.

The term "and/or" describes only an association relationship for describing associated objects and represents that there may be three relationships. For example, A and/or B may represent the following three cases: only A exists, both A and B exist, and only B exists. A, B, and C each may be singular or plural. This is not limited.

When the functions are implemented in the form of a software functional unit and sold or used as an independent product, the functions may be stored in a computer-readable storage medium. Based on such an understanding, the embodiments essentially, or the part contributing to the prior art, or some of the embodiments may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk drive, a ROM, a RAM, a magnetic disk, or an optical disc.

The foregoing descriptions are merely implementations, but are not intended to limit the scope of the embodiments. Any variation or replacement readily figured out by a person skilled in the art shall fall within the scope of the embodiments.

What is claimed is:

1. A computation offloading method, comprising:
   sending, by a first terminal device, a first state of a first computational task to a first edge node, wherein the first edge node is an edge node from which the first terminal device obtains computing resources, and the first state comprises at least one of a length of a data stream for transmitting the first computational task, a quantity of clock cycles that need to be consumed for computing the first computational task, or a penalty value of the first computational task;

receiving, by the first terminal device, a second offloading decision sent by the first edge node, wherein the second offloading decision is determined based on the first state, the second offloading decision comprises computing resource allocation information of one or more second terminal devices, the second terminal device is a terminal device that obtains computing resources from the first edge node, and the first terminal device is one of the one or more second terminal devices; and determining, by the first terminal device using a multi-agent deep reinforcement learning (MADRL) algorithm that optimizes and weighs both delay and energy consumption, a first offloading decision of the first computational task according to the second offloading decision, wherein the energy consumption comprises a switching energy consumed by the first terminal device for switching from sleep power $P_{sleep}$ to a first operating power $P_1$ and the delay comprises a switching delay of switching the first terminal device from the sleep power $P_{sleep}$ to the first operating power $P_1$, wherein the sleep power $P_{sleep}$ indicates operating power of the first terminal device to offload the first computational task to the first edge node for computing and the first operating power $P_1$ indicates operating power of the first computational task executed at the first terminal device; and offloading, based upon the first offloading decision, the first terminal device offloads the first computational task from the first terminal device to the first edge node for computing.

2. The computation offloading method according to claim 1, further comprising:

when the first offloading decision indicates the first terminal device to offload the first computational task to the first edge node for computing, sending, by the first terminal device, the first computational task to the first edge node; and receiving, by the first terminal device, a computation result that is of the first computational task and that is sent by the first edge node; or when the first offloading decision indicates the first terminal device not to offload the first computational task, locally determining, by the first terminal device, a computation result of the first computational task.

3. The computation offloading method according to claim 1, wherein determining, by the first terminal device, the first offloading decision of the first computational task according to the second offloading decision further comprises:

updating, by the first terminal device, a parameter in the first state of the first computational task according to the second offloading decision, to obtain a second state of the first computational task;

computing, by the first terminal device, a cost value of the first computational task based on the second state, wherein the cost value of the first computational task comprises a local overhead and an offloading overhead of the first computational task; and determining, by the first terminal device, the first offloading decision of the first computational task based on the cost value of the first computational task.

4. The computation offloading method according to claim 3, wherein computing, by the first terminal device, the cost value of the first computational task based on the second state further comprises:

determining, by the first terminal device, the cost value of the first computational task based on the second state by using a first cost function in the MADRL algorithm, wherein the first cost function comprises an offload overhead function and a local computation overhead function, the offload overhead function is used to determine the offloading overhead of the first computational task, and the local computation overhead function is used to determine the local overhead of the first computational task; and determining, by the first terminal device, the first offloading decision of the first computational task based on the cost value of the first computational task further comprises:

determining, by the first terminal device, the first offloading decision of the first computational task based on an iterative learning process using the MADRL algorithm.

5. The computation offloading method according to claim 4, wherein the offloading overhead of the first computational task comprises a first energy consumption overhead and a first delay overhead; the first energy consumption overhead comprises energy consumed by the first terminal device to offload the first computational task to the first edge node; and the first delay overhead comprises a delay of offloading, by the first terminal device, the first computational task to the first edge node and a delay of computing, by the first edge node, the computation result of the first computational task.

6. The computation offloading method according to claim 4, wherein the local overhead of the first computational task comprises a second energy consumption overhead and a second delay overhead; the second energy consumption overhead comprises energy consumed by the first terminal device for locally computing the first computational task and the switching energy; the second delay overhead comprises a delay of locally computing the first computational task by the first terminal device and the switching delay.

7. The computation offloading method according to claim 6, wherein the first offloading decision further comprises evaluating a second operating power corresponding to a minimum cost value of the first computational task when the MADRL algorithm meets a termination condition.

8. The computation offloading method according to claim 6, wherein when the first offloading decision indicates the first terminal device to offload the first computational task to the first edge node for computing, the first terminal device operates at the sleep power.

9. The computation offloading method according to claim 5, further comprising:

dynamically adjusting, by the first terminal device, the first delay overhead by using a first parameter, and the first parameter indicates a difference between processing a computational task by the first terminal device and processing a computational task by the first edge node.

10. The computation offloading method according to claim 6, further comprising:

dynamically adjusting, by the first terminal device, the first energy consumption overhead and the second energy consumption overhead by using a second parameter, and the second parameter indicates sensitivity of the first terminal device to an energy consumption overhead.

11. A computation offloading method, comprising:

receiving, by a first edge node, states of one or more tasks, wherein the states of the one or more tasks comprise a first state of a first computational task sent by a first terminal device, the first edge node is an edge node that provides computing resources for one or more second terminal devices, and the first terminal device is one of the one or more second terminal devices;

determining, by the first edge node using a multi-agent deep reinforcement learning (MADRL) algorithm that optimizes and weights both delay and energy consumption, a second offloading decision based on the states of the one or more tasks, wherein the second offloading decision comprises computing resource allocation information of the first edge node for the one or more second terminal devices, wherein the energy consumption comprises a switching energy consumed by the first terminal device for switching from sleep power $P_{sleep}$ to a first operating power $P_1$ and the delay comprises a switching delay of switching the first terminal device from the sleep power $P_{sleep}$ to the first operating power $P_1$, wherein the sleep power $P_{sleep}$ indicates operating power of the first terminal device to offload the first computational task to the first edge node for computing and the first operating power $P_1$ indicates operating power of the first computational task executed at the first terminal device;

broadcasting, by the first edge node, the second offloading decision to the one or more second terminal devices;

offloading the first computational task from first terminal device to the first edge node.

12. The computation offloading method according to claim 11, further comprising:

receiving, by the first edge node, the first computational task sent by the first terminal device;

determining, by the first edge node, a computation result of the first computational task; and sending, by the first edge node, the computation result of the first computational task to the first terminal device.

13. The computation offloading method according to claim 11, wherein determining, by the first edge node, the second offloading decision based on the states of one or more tasks further comprises:

updating, by the first edge node, a third state of the first edge node based on the states of the one or more tasks to obtain a fourth state of the first edge node, wherein the third state is a state before the first edge node receives the states of the one or more tasks;

determining, by the first edge node, a cost value of the first edge node based on the fourth state, wherein the cost value of the first edge node is an overhead for allocating the computing resources by the first edge node to the one or more computational tasks; and determining, by the first edge node, the second offloading decision based on the cost value of the first edge node.

14. The computation offloading method according to claim 13, wherein the determining, by the first edge node, the cost value of the first edge node based on the fourth state further comprises:

determining, by the first edge node, the cost value of the first edge node based on the fourth state by using a first cost function and a second cost function in the MADRL algorithm, wherein the first cost function comprises an offload overhead function and a local computation overhead function, the offload overhead function is used to determine offloading overheads of the one or more tasks, and the local computation overhead function is used to compute local overheads of the one or more tasks; the second cost function comprises an average cost function and a fair cost function, the average cost function is used to determine an average overhead of the one or more tasks based on the offloading overheads and the local overheads of the one or more tasks, and the fair cost function is used to determine a fair cost of the first edge node based on a quantity of second terminal devices that use computing resources of the first edge node; and determining, by the first edge node, the cost value of the first edge node based on the average overhead of the one or more tasks and the fair cost of the first edge node.

15. The computation offloading method according to claim 14, wherein determining, by the first edge node, the second offloading decision based on the cost value of the first edge node further comprises:

when the MADRL algorithm meets a termination condition, determining, by the first edge node, the second offloading decision based on an iterative learning process using the MADRL algorithm.

16. A communication apparatus, comprising at least one processor, wherein the at least one processor is coupled to at least one memory storing a computer program or instructions, which when configure the at least one processor to:

send a first state of a first computational task to a first edge node, wherein the first edge node is an edge node from which the apparatus obtains computing resources, and the first state comprises at least one of a length of a data stream for transmitting the first computational task, a quantity of clock cycles that need to be consumed for computing the first computational task, and a penalty value of the first computational task;

receive a second offloading decision sent by the first edge node, wherein the second offloading decision is determined based on the first state, the second offloading decision comprises computing resource allocation information of one or more second terminal devices, the second terminal device is a terminal device that obtains computing resources from the first edge node, and the communication apparatus is one of the one or more second terminal devices; and determine a first offloading decision of the first computational task according to the second offloading decision using a multi-agent deep reinforcement learning (MADRL) algorithm that optimizes and weighs both delay and energy consumption, wherein the energy consumption comprises a switching energy consumed by the first terminal device for switching from sleep power $P_{sleep}$ to a first operating power $P_1$ and the delay comprises a switching delay of switching the first terminal device from the sleep power $P_{sleep}$ to the first operating power $P_1$, wherein the sleep power $P_{sleep}$ indicates operating power of the first terminal device to offload the first computational task to the first edge node for computing and the first operating power $P_1$ indicates operating power of the first computational task executed at the first terminal device; and offloading, based upon the first offloading decision, the first computational task from the one or more second terminal devices to the first edge node for computing.

17. The communication apparatus according to claim 16, wherein the computer program or instructions further configure the at least one processor to:

send, in response to the first offloading decision indicates apparatus to offload the first computational task to the first edge node for computing, the first computational task to the first edge node; and receive a computation result that is of the first computational task and that is sent by the first edge node; or locally determine, in response to the first offloading decision indicates apparatus not to offload the first computational task, a computation result of the first computational task.

18. The communication apparatus according to claim 16, wherein the computer program or instructions further configure the at least one processor to:

update a parameter in the first state of the first computational task according to the second offloading decision, to obtain a second state of the first computational task;

compute a cost value of the first computational task based on the second state, wherein the cost value of the first computational task comprises a local overhead and an offloading overhead of the first computational task; and determine the first offloading decision of the first computational task based on the cost value of the first computational task.

19. The communication apparatus according to claim 18, wherein the computer program or instructions further configure the at least one processor to:

determine the cost value of the first computational task based on the second state by using a first cost function in the MADRL algorithm, wherein the first cost function comprises an offload overhead function and a local computation overhead function, the offload overhead function is used to determine the offloading overhead of the first computational task, and the local computation overhead function is used to determine the local overhead of the first computational task; and iteratively update a state of the first computational task and the cost value of the first computational task of the apparatus based on the MADRL algorithm; and determine, in response to the MADRL algorithm meeting a termination condition, the first offloading decision of the first computational task based on an iterative learning process using the MADRL algorithm.

20. The communication apparatus according to claim 19, wherein the offloading overhead of the first computational task comprises a first energy consumption overhead and a first delay overhead; the first energy consumption overhead comprises energy consumed by the apparatus to offload the first computational task to the first edge node; and the first delay overhead comprises a delay of offloading, by the apparatus, the first computational task to the first edge node and a delay of computing, by the first edge node, the computation result of the first computational task.

* * * * *